United States Patent
Iijima

(10) Patent No.: US 10,955,732 B2
(45) Date of Patent: Mar. 23, 2021

(54) IMAGING OPTICAL SYSTEM, IMAGE PROJECTION APPARATUS USING THE SAME, AND IMAGE PROJECTION SYSTEM HAVING LENS UNITS WHICH ARE ARRANGED FROM AN ENLARGEMENT CONJUGATE SIDE TOWARD A REDUCTION CONJUGATE SIDE

(71) Applicant: CANON KABUSHIKI KAISHA, Tokyo (JP)

(72) Inventor: Ryo Iijima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/433,827

(22) Filed: Jun. 6, 2019

(65) Prior Publication Data
US 2019/0377250 A1  Dec. 12, 2019

(30) Foreign Application Priority Data
Jun. 7, 2018  (JP) .............................. JP2018-109868

(51) Int. Cl.
*G03B 21/14* (2006.01)
*G02B 15/177* (2006.01)

(52) U.S. Cl.
CPC ......... *G03B 21/147* (2013.01); *G02B 15/177* (2013.01)

(58) Field of Classification Search
CPC .............. G02B 15/146; G02B 15/1461; G02B 15/1465; G02B 15/177; G02B 15/20; G03B 21/147
See application file for complete search history.

(56) References Cited

U.S. PATENT DOCUMENTS

| | | | | |
|---|---|---|---|---|
| 8,792,168 B2* | 7/2014 | Yasui | .................. | G02B 5/1814 359/565 |
| 8,836,822 B2* | 9/2014 | Imaoka | .............. | G02B 27/0025 348/240.3 |
| 8,873,157 B2* | 10/2014 | Imaoka | ................ | G02B 15/177 359/680 |
| 9,086,560 B2* | 7/2015 | Inoko | ..................... | G02B 13/04 |

(Continued)

FOREIGN PATENT DOCUMENTS

| | | |
|---|---|---|
| JP | 2016-224234 A | 12/2016 |
| JP | 2017-219630 A | 12/2017 |
| JP | 2018-63297 A | 4/2018 |

OTHER PUBLICATIONS https://en.wikipedia.org/wiki/Doublet_(lens) (Year: 2010).*

*Primary Examiner* — Bao-Luan Q Le
(74) *Attorney, Agent, or Firm* — Canon U.S.A., Inc. IP Division

(57) ABSTRACT

There are provided a first lens unit having negative refractive power, a second lens unit having positive refractive power, a third lens unit having negative refractive power, and fourth, fifth, sixth, and seventh lens units, which are arranged from an enlargement conjugate side toward a reduction conjugate side in this order, the first lens unit includes at least one negative lens and at least one positive lens arranged closer to the reduction conjugate side than the at least one negative lens, the third lens unit is movable from the enlargement conjugate side toward the reduction conjugate side for the zooming, and the refractive index of a lens included in the third lens unit meets a predetermined conditional equation.

19 Claims, 14 Drawing Sheets

(56) References Cited

U.S. PATENT DOCUMENTS

| | | | | |
|---|---|---|---|---|
| 9,285,574 | B2* | 3/2016 | Inoue | G02B 15/177 |
| 9,740,086 | B2* | 8/2017 | Shiokawa | G02B 13/16 |
| 9,835,932 | B2* | 12/2017 | Imaoka | G02B 15/177 |
| 10,168,602 | B2* | 1/2019 | Masui | G03B 21/14 |
| 10,473,901 | B2* | 11/2019 | Harada | G02B 27/646 |
| 10,527,829 | B2* | 1/2020 | Harada | G02B 15/20 |
| 2012/0081790 | A1* | 4/2012 | Yasui | G02B 15/177 |
| | | | | 359/570 |
| 2013/0070114 | A1* | 3/2013 | Imaoka | G02B 15/177 |
| | | | | 348/220.1 |
| 2013/0070123 | A1* | 3/2013 | Imaoka | G02B 27/0025 |
| | | | | 348/240.3 |
| 2014/0192419 | A1* | 7/2014 | Inoko | G02B 15/177 |
| | | | | 359/649 |
| 2015/0219884 | A1* | 8/2015 | Inoue | G03B 21/142 |
| | | | | 359/680 |
| 2016/0209632 | A1* | 7/2016 | Imaoka | G02B 15/22 |
| 2016/0216494 | A1* | 7/2016 | Shiokawa | G02B 13/18 |
| 2018/0136444 | A1* | 5/2018 | Harada | G02B 15/177 |
| 2018/0149951 | A1* | 5/2018 | Masui | G02B 7/10 |
| 2018/0180858 | A1* | 6/2018 | Harada | G03B 5/00 |
| 2018/0307011 | A1 | 10/2018 | Uehara | |
| 2020/0026048 | A1* | 1/2020 | Machida | G02B 13/02 |
| 2020/0026049 | A1* | 1/2020 | Machida | G02B 15/145511 |

* cited by examiner

IMAGING OPTICAL SYSTEM, IMAGE PROJECTION APPARATUS USING THE SAME, AND IMAGE PROJECTION SYSTEM HAVING LENS UNITS WHICH ARE ARRANGED FROM AN ENLARGEMENT CONJUGATE SIDE TOWARD A REDUCTION CONJUGATE SIDE

BACKGROUND OF THE INVENTION

Field of the Invention

The aspect of the embodiments relates to an imaging optical system, an image projection apparatus using the same, and an image projection system.

Description of the Related Art

A projection lens described in Japanese Patent Laid-Open No. 2017-219630 is known as a projection lens (imaging optical system) including seven lens units. The projection lens described in Japanese Patent Laid-Open No. 2017-219630 includes a negative first lens unit, a positive second lens unit, a negative third lens unit, a positive fourth lens unit, a positive fifth lens unit, a negative or positive sixth lens unit, and a positive seventh lens unit. The projection lens is configured such that the second to sixth lens units move during zooming. The negative first lens unit and the like herein indicate whether the refractive power of a lens unit is positive or negative.

In the projection lens described in Japanese Patent Laid-Open No. 2017-219630, the first lens unit includes at least one negative lens and at least one positive lens thereby to reduce the amount of aberration caused in the first lens unit. Further, the refractive power of the second lens unit is set to be positive and the refractive power of the third lens unit is set to be negative thereby to reduce the amount of aberration caused from the second lens unit toward the third lens unit.

The refractive index of the third lens unit is 1.49700 to 1.69680 in the projection lens described in Japanese Patent Laid-Open No. 2017-219630. When the refractive index of the third lens unit is low, the amount of movement of the third lens unit is to be increased during zooming in order to maintain the refracting angle (the amount of refraction) in the third lens unit. An increase in the amount of movement during zooming causes an increase in size of the entire projection lens.

SUMMARY OF THE INVENTION

An imaging optical system includes a plurality of lens units including a first lens unit having negative refractive power, a second lens unit having positive refractive power, a third lens unit having negative refractive power, a fourth lens unit, a fifth lens unit, a sixth lens unit, and a seventh lens unit, which are sequentially arranged from an enlargement conjugate side toward a reduction conjugate side, in which the lens units are configured such that an interval between adjacent lens units changes during zooming from a wide-angle end toward a telephoto end, the first lens unit includes at least one negative lens, and at least one positive lens arranged closer to the reduction conjugate side than the at least one negative lens, the third lens unit is movable from the enlargement conjugate side toward the reduction conjugate side for the zooming, and the imaging optical system meets the following equation assuming a refractive index of a lens included in the third lens unit at nb3n: $1.72 \leq nb3n \leq 1.95$.

Further features of the disclosure will become apparent from the exemplary embodiments (with reference to the attached drawings).

DESCRIPTION OF THE EMBODIMENTS (Configuration of Projector)

Figure 13:
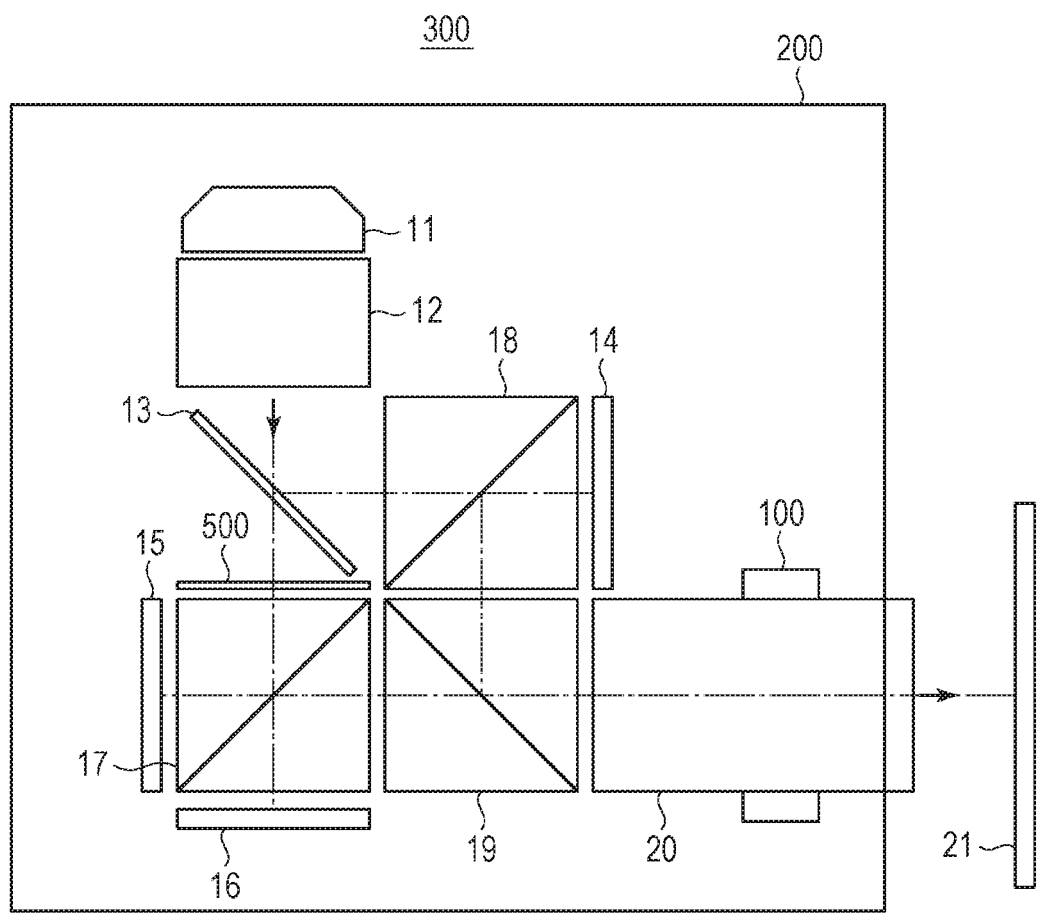
FIG. 13 is a diagram illustrating a configuration of an image display apparatus using a zoom lens according to each embodiment.
Figure 14:
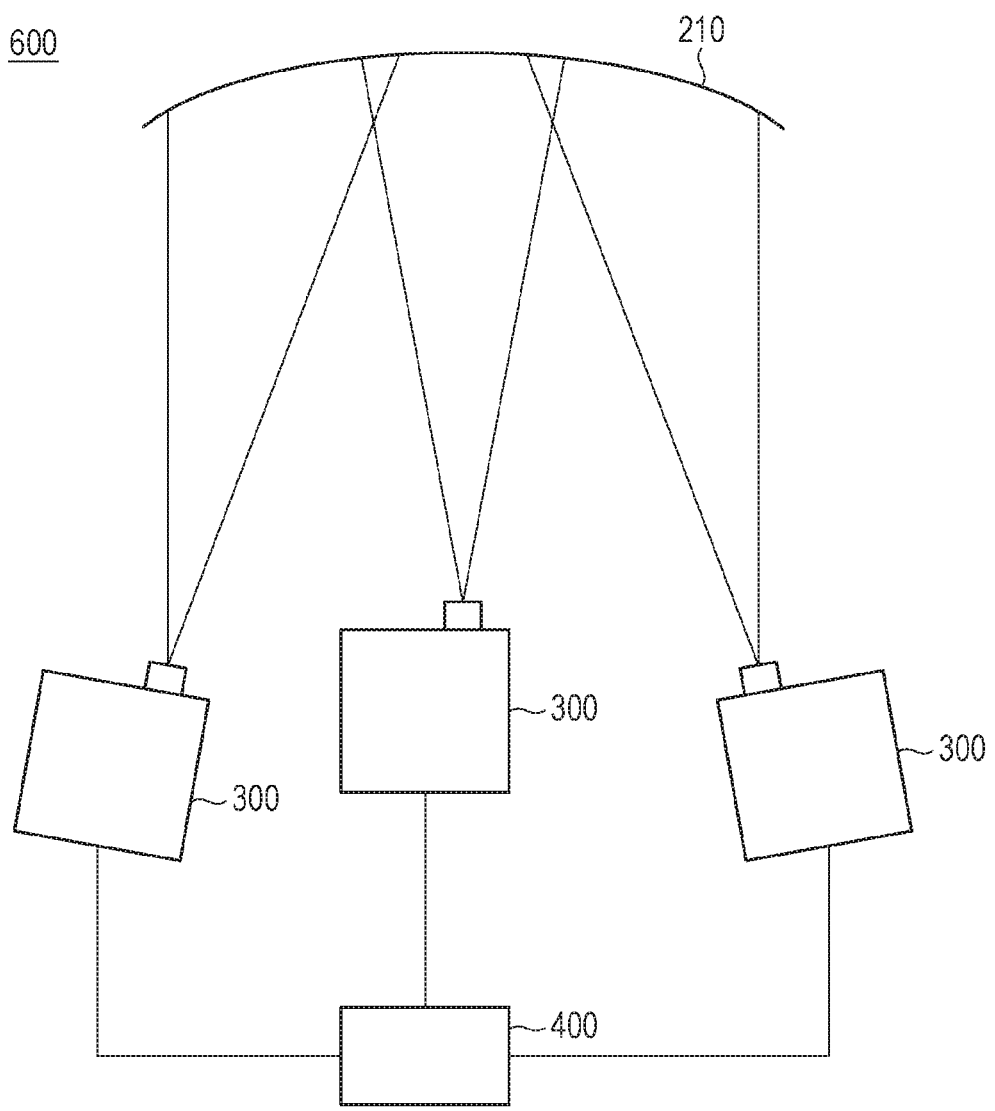
FIG. 14 is a diagram illustrating a configuration of an image projection system.

A configuration of a projector (image projection apparatus) 300 capable of mounting a projection lens (zoom lens, imaging optical system) 20 described in each embodiment described below will be first described with reference to FIG. 13. The chain lines in FIG. 13 indicate the optical axes of the projection lens 20 and an illumination optical system 12. The arrows in FIG. 13 indicate a light traveling direction.

Reference numeral 11 indicates a light source, and more specifically the light source 11 is a lamp light source including a light emitting tube and a parabolic reflector for making light scattered from the light emitting tube to be parallel light. A light source including a blue laser diode (LD) for emitting blue light and a yellow fluorescent body for emitting a yellow light by use of light from the blue LD as excitation light may be employed instead of the light source 11. Alternatively, a light source including a red LD for emitting red light, a green LD for emitting green light, and the blue LD may be employed instead of the light source 11.

Reference numeral 12 indicates an illumination optical system for guiding light from the light source 11 to a reflective liquid crystal panel (optical modulator). The illumination optical system 12 includes a first fly-eye lens array for dividing light from the light source 11 into a plurality of beams, and a second fly-eye lens array for receiving light from the first fly-eye lens array. The illumination optical system 12 further includes a polarization conversion element for aligning a polarization direction of light from the light source 11 in a predetermined direction, and a condenser lens for guiding light from the polarization conversion element to the reflective liquid crystal panel.

Green light in white light from the illumination optical system 12 is guided to a green reflective liquid crystal panel 14 via a first polarization beam splitter (PBS) 18 by a dichroic mirror 13. Red light and blue light in the white light from the illumination optical system 12 are guided to a wavelength-selective phase plate 500 by the dichroic mirror 13. The wavelength-selective phase plate 500 is configured to convert the polarization direction of the blue light by 90 degrees and not to convert the polarization direction of the red light.

The blue light from the wavelength-selective phase plate 500 is guided to a blue reflective liquid crystal panel 15 via a second PBS 17. The red light from the wavelength-selective phase plate 500 is guided to a red reflective liquid crystal panel 16 via the second PBS 17.

The light from each color's reflective liquid crystal panel is combined in a combining prism 19, and light from the combining prism 19 is guided to a plane screen 21 via the projection lens 20.

The illumination optical system 12, the dichroic mirror 13, the first PBS 18, the second PBS 17, the wavelength-selective phase plate 500, and the combining prism 19 are assumed as a light guide optical system. The light guide optical system is directed for guiding light from the light source 11 to each color's reflective liquid crystal panel and guiding light from each color's reflective liquid crystal panel to the projection lens 20. Not the reflective liquid crystal panels but a transmissive liquid crystal panel or micromirror array may be used as an optical modulator. A configuration of the light guide optical system may be changed as needed according to an optical modulator.

A holding part 100 can detachably hold the projection lens 20. The projection lens 20 may be configured to be undetachably held in the holding part 100. The above components are provided inside an exterior member 200.

(Configuration of Projection System)

The configuration a projection system (image projection system) 600 using the above projector 300 will be described. The projection system 600 includes a plurality of projectors 300, and a computer (control part) 400 for controlling the projectors 300. The projection system 600 may further include a curved screen 210. Further, the projection system 600 may include only one projector 300. At least one projector 300 has only to be included in the projectors provided in the projection system 600, and all the projectors do not need to be the projectors 300.

The projection system 600 is a flight simulator, in which image information based on a pilot view of an airplane is transmitted from the computer 400 to each projector 300 and an image based on the pilot view of the airplane is displayed on the curved screen 210. Of course, the projection system 600 may be not a flight simulator but a projection system for movie watching, or the like.

(Configuration of Projection Lens)

The configurations of the projection lenses according to first to fourth embodiments will be described below with reference to FIG. 1 to FIG. 12. A common configuration in the projection lenses according to the first to fourth embodiments will be first described mainly by way of the projection lens according to the first embodiment illustrated in FIG. 1.

Figure 1:
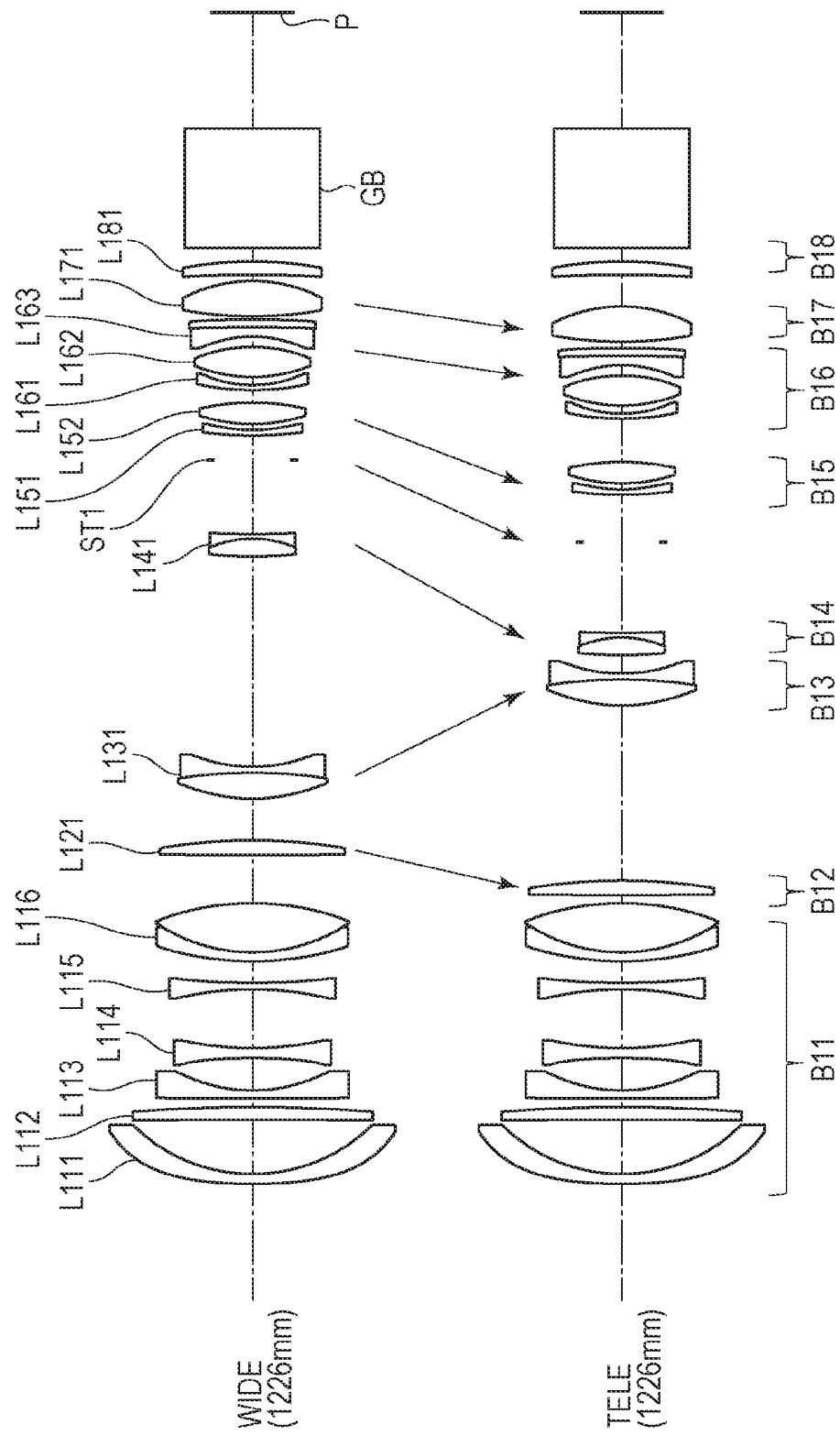
FIG. 1 is a cross-section view illustrating a configuration of a zoom lens according to a first embodiment.

The left part of FIG. 1 is an enlargement conjugate side (image side, screen side), the right part thereof is a reduction conjugate side (object side, panel side), GB in FIG. 1 indicates a prism part, P indicates an image forming plane (conjugate plane) on the reduction conjugate side, and ST indicates a stop. These are the same also in FIG. 4, FIG. 7, and FIG. 10.

A projection lens according to each embodiment includes a plurality of lens units including at least the following lens units which are sequentially arranged from the enlargement conjugate side toward the reduction conjugate side. That is, a first lens unit having negative refractive power, a second lens unit having positive refractive power, a third lens unit having negative refractive power, and fourth, fifth, sixth, and seventh lens units are provided. More specifically, the projection lens according to the second embodiment includes the first to seventh lens units, and the projection lenses according to the first, third, and fourth embodiments further include an eighth lens unit.

The lens units are configured such that an interval between adjacent lens units changes during zooming from the wide-angle end toward the telephoto end (simply denoted as zooming below). All the lens units do not need to move in the optical axis direction of the projection lens during zooming. At least the intervals between adjacent lens units have only to change during zooming. For example, if a lens unit B adjacent to an immovable lens unit A moves during zooming, the interval between the adjacent lens unit A and lens unit B changes during the zooming. That is, a boundary between lens units is within a changing interval between the lenses during zooming. The lens unit herein means both a single lens and a collection of lenses.

The first lens unit includes at least one negative lens, and at least one positive lens arranged closer to the reduction conjugate side than the at least one negative lens. Thereby, an aberration caused in the first lens unit can be prevented from occurring. The first lens unit includes a plurality of lenses, entirely has negative refractive power, and is immovable for zooming.

The second lens unit has positive refractive power, and moves from the reduction conjugate side toward the enlargement conjugate side for zooming. The third lens unit has negative refractive power, and moves from the enlargement conjugate side toward the reduction conjugate side for zooming. The second lens unit has positive refractive power and the third lens unit has negative refractive power thereby to prevent an aberration caused from the second lens unit toward the third lens unit from occurring.

The fourth lens unit has positive or negative refractive power, and moves from the reduction conjugate side toward the enlargement conjugate side for zooming. That is, the interval between the second lens unit and the third lens unit is widened and the interval between the third lens unit and the fourth lens unit is narrowed due to zooming.

With the configuration, the second lens unit and the third lens unit approach each other at a position where an off-axis beam is high at the wide-angle end to be almost one lens unit. Consequently, field curvature aberration and distortion aberration caused by the strongly-negative first lens unit can be corrected. The third lens unit and the fourth lens unit are positioned closer to the stop at the telephoto end, which contributes to correction of coma aberration. In this way, the balance of aberration correction by each lens units in the three lens units including the second lens unit, the third lens unit, and the fourth lens unit at the wide-angle end and the telephoto end becomes appropriate, thereby achieving correction effects for correcting coma aberration, field curvature aberration, and distortion aberration.

An aperture stop is provided closer to the reduction conjugate side than the fourth lens unit. The stop moves in the optical axis direction in a different trajectory from each lens unit for zooming according to each embodiment. However, the stop may be integrally held in other lens unit, or may move for zooming in the same trajectory as other lens unit. The stop is positioned closer to the reduction conjugate side than the second lens unit, the third lens unit, and the fourth lens unit so that the stop can be arranged without preventing movement of especially the third lens unit and the fourth lens unit.

Assuming the refractive index of a lens included in the third lens unit at nb3n, a projection lens according to each embodiment meets the following conditional equation (1):

$$1.72 \leq nb3n \leq 1.95 \tag{1}$$

When the third lens unit includes only one lens, the refractive index of nb3n is the refractive index of the lens. When the third lens unit includes a plurality of lenses, the refractive index of nb3n is an average value of the refractive indexes of the lenses. When a value falls below the lower limit in the conditional equation (1), the refractive index of the third lens unit is too low, the amount of movement of the third lens unit increases during zooming, and undesirably the entire size of the projection lens increases. Particularly as in each embodiment, the amount of movement of the third lens unit during zooming is difficult to increase in the projection lens in which the interval between the third lens unit and the fourth lens unit is narrowed due to zooming. Thus, the projection lens meets the conditional equation (1).

When the upper limit in the conditional equation (1) is exceeded, undesirably the refractive index of the third lens unit is too high.

In this case, the number of lenses included in other lens unit or the amount of movement of other lens unit during zooming is to be increased in order to restrict aberration variation caused by movement of the third lens unit during zooming. Consequently, undesirably the entire size of the projection lens increases.

In this way, a projection lens according to each embodiment meets the conditional equation (1), thereby achieving preferable optical performance while restricting an increase in size. The lower limit and the upper limit in the conditional equation (1) may be changed as follows:

$$1.72 \leq nb3n \leq 1.89 \tag{1a}$$

$$1.75 \leq nb3n \leq 1.85 \tag{1b}$$

The interval between the second lens unit and the third lens unit at the wide-angle end is assumed at Db2b3WIDE. The interval between the second lens unit and the third lens unit at the telephoto end is assumed at Db2b3TELE. At this time, the projection lens meets the following conditional equation (2):

$$0.05 \leq Db2b3\text{WIDE}/Db2b3\text{TELE} \leq 0.70 \tag{2}$$

When the upper limit in the conditional equation (2) is exceeded, the second lens unit and the third lens unit are difficult to separate at the telephoto end, which undesirably causes deterioration in coma aberration. Further, when a value falls below the lower limit in the conditional equation (2), undesirably the amount of movement of the third lens unit increases, the level of difficulty in manufacture increases, and the total lens length increases. The lower limit and the upper limit in the conditional equation (2) may be changed as follows:

$$0.05 \leq Db2b3\text{WIDE}/Db2b3\text{TELE} \leq 0.50 \tag{2a}$$

$$0.1 \leq Db2b3\text{WIDE}/Db2b3\text{TELE} \leq 0.50 \tag{2b}$$

The interval between the third lens unit and the fourth lens unit at the wide-angle end is assumed at Db3b4WIDE. The interval between the third lens unit and the fourth lens unit at the telephoto end is assumed at Db3b4TELE. At this time, the projection lens meets the following conditional equation (3):

$$1.5 \leq Db3b4\text{WIDE}/Db3b4\text{TELE} \leq 50 \tag{3}$$

When the upper limit in the conditional equation (3) is exceeded, undesirably the interval between the third lens unit and the fourth lens unit at the wide-angle end is too wide and the total lens length increases. Further, since the second lens unit approaches the first lens unit, undesirably the magnification capability lowers and the power of the lens units increases. When a value falls below the lower limit in the conditional equation (3), undesirably difficulty in manufacture is caused due to remarkable approach of the fourth lens unit to the third lens unit or a larger amount of movement of the stop. The lower limit and the upper limit in the conditional equation (3) may be changed as follows:

$$5.0 \leq Db3b4\text{WIDE}/Db3b4\text{TELE} \leq 50 \tag{3a}$$

$$3.5 \leq Db3b4\text{WIDE}/Db3b4\text{TELE} \leq 30 \tag{3b}$$

Then, the focal distance of the third lens unit is assumed at FB3 and the focal distance of the fourth lens unit is assumed at PB4. At this time, the projection lens meets the following conditional equation (4):

$$0.01 \leq |FB3/FB4| \leq 0.70 \tag{4}$$

When the upper limit in the conditional equation (4) is exceeded, undesirably the refractive power of the fourth lens unit is too high and the balance of correction with respect to the third lens unit is deteriorated especially at the telephoto end. More specifically, undesirably excessive coma aberration or spherical aberration is caused near the stop. When a value falls below the lower limit in the conditional equation (4), the capability to correct field curvature aberration at the wide-angle end lowers. Undesirably the magnification capability lowers and an increase in the amount of movement in the entire zoom lens is caused. The lower limit and the upper limit in the conditional equation (4) may be changed as follows:

$$0.01 \leq |FB3/FB4| \leq 0.50 \tag{4a}$$

$$0.08 \leq |FB3/FB4| \leq 0.40 \tag{4b}$$

Further, the fourth lens unit includes a cemented lens. The fourth lens unit largely contributes to correction of field curvature aberration and chromatic aberration especially at the telephoto end. Thus, the positive lens of the fourth lens unit is made of a glass material with high refractive index and low dispersion, thereby obtaining a different resolution.

Then, the Abbe constant of a lens included in the third lens unit is assumed at vb3n. At this time, the projection lens meets the following conditional equation (5):

$$2.0 \le nb3n+0.00733vb3n \le 2.20 \quad (5)$$

When the third lens unit includes only one lens, the abbe constant of vb3n is that of the lens. When the third lens unit includes a plurality of lenses, the Abbe constant of vb3n is an average value of the Abbe constants of the lenses.

When a value falls below the lower limit in the conditional equation (5), the refractive index of the third lens is too low, and undesirably the size of the projection lens increases like when a value falls below the lower limit in the conditional equation (1). Further, when a value falls below the lower limit in the conditional equation (5), undesirably the Abbe constant is so low or the dispersion is so large that especially chromatic aberration increases. When the upper limit in the conditional equation (5) is exceeded, undesirably the refractive index of the third lens unit is so high that the size of the projection lens increases like when the upper limit in the conditional equation (1) is exceeded. Further, when the upper limit in the conditional equation (5) is exceeded, undesirably the kinds of selectable glass materials are discrete and less, and an appropriate glass material cannot be selected. The lower limit and the upper limit in the conditional equation (5) may be changed as follows:

$$2.05 \le nb3n+0.00733vb3n \le 2.15 \quad (5a)$$

A projection lens according to each embodiment will be individually described.

First Embodiment

The projection lens according to the present embodiment will be described with reference to FIG. 1 to FIG. 3. FIG. 1 is a diagram illustrating a configuration of the projection lens according to the present embodiment with a projection distance of 1226 mm. The upper part of FIG. 1 illustrates a configuration at the wide-angle end and the lower part thereof illustrates a configuration at the telephoto end. The projection lens according to the present embodiment is a wide-angle zoom lens with a half angle of view of 44.2 degrees at the wide-angle end.

The projection lens according to the present embodiment includes the following lens units which are sequentially arranged from the enlargement conjugate side toward the reduction conjugate side. That is, the projection lens according to the present embodiment includes a negative first lens unit B11 immovable for zooming, and a positive second lens unit B12, a negative third lens unit B13, and a positive fourth lens unit B14 which move for zooming, respectively. The projection lens according to the present embodiment further includes a stop ST1 independently moving for zooming, and a positive fifth lens unit B15, a negative sixth lens unit B16, and a positive seventh lens unit B17 which move for zooming, respectively. The projection lens according to the present embodiment further includes a positive eighth lens unit B18 immovable for zooming.

That is, the first lens unit B11 and the eighth lens unit B18 are immovable (fixed) for zooming. The second lens unit B12 and the third lens unit B13 move while widening the interval therebetween, and the third lens unit B13 and the fourth lens unit B14 move while narrowing the interval therebetween. The fifth, sixth, and seventh lens units move from the reduction conjugate side toward the enlargement conjugate side.

The first lens unit B11 is configured of a negative lens L111, a positive lens L112, a negative lens L113, a negative lens L114, a negative lens L115, and a positive assembled lens L116 from the enlargement conjugate side toward the reduction conjugate side in this order. The second lens unit B12 is configured of a positive lens L121. The third lens unit B13 is configured of a negative assembled lens L131. The fourth lens unit B14 is configured of a positive assembled lens L141.

The flare-cut stop ST1 for shielding an off-axis beam is provided between the third lens unit B13 and the fourth lens unit B14.

The fifth lens unit B15 is configured of a negative lens L151 and a positive lens L152 from the enlargement conjugate side toward the reduction conjugate side in this order. The sixth lens unit B16 is configured of a negative lens L161, a positive lens L162, and a negative assembled lens L163 from the enlargement conjugate side toward the reduction conjugate side in this order. The seventh lens unit B17 is configured of a positive lens L171. The eighth lens unit B18 is configured of a positive lens L181.

Figure 2:
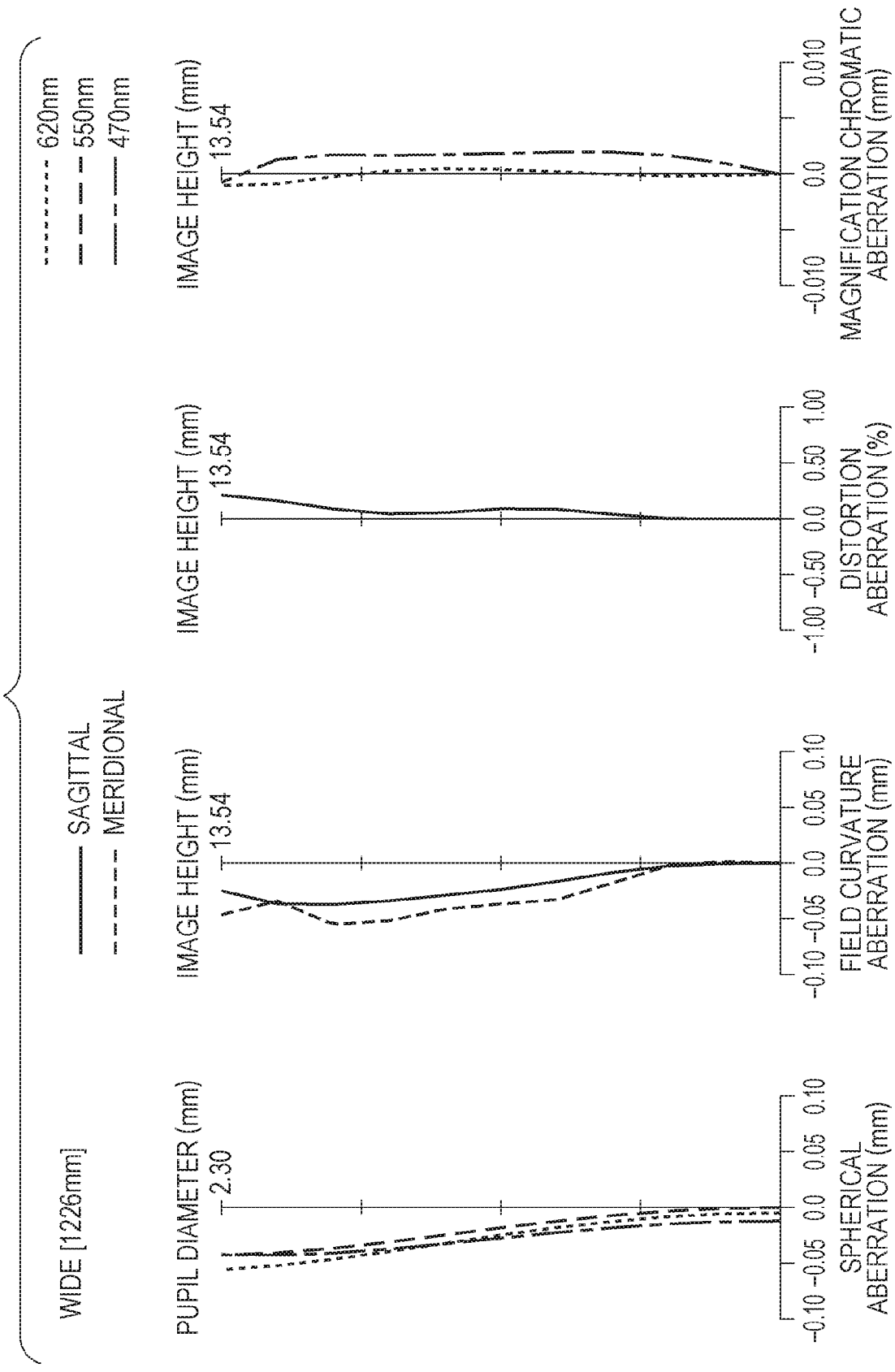
FIG. 2 is an aberration diagram with a projection distance of 1226 mm at a wide-angle end of the zoom lens according to the first embodiment.
Figure 3:
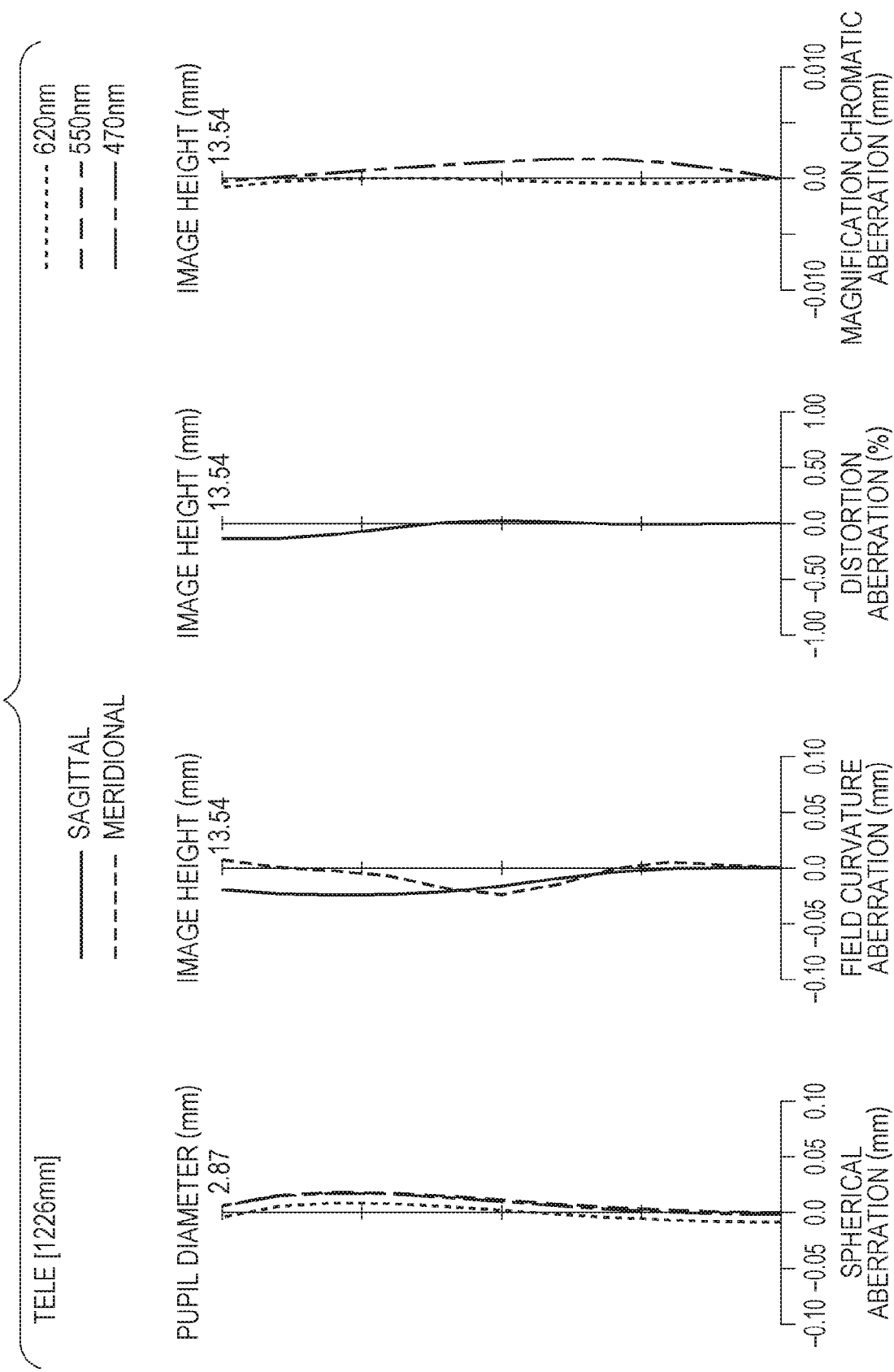
FIG. 3 is an aberration diagram with a projection distance of 1226 mm at a telephoto end of the zoom lens according to the first embodiment.

FIG. 2 is a longitudinal aberration diagram with a projection distance of 1226 mm at the wide-angle end of the projection lens according to the present embodiment. FIG. 3 is a longitudinal aberration diagram with a projection distance of 1226 mm at the telephoto end of the projection lens according to the present embodiment. As illustrated in FIG. 2 and FIG. 3, it can be seen that the projection lens according to the present embodiment less changes in its performance and obtains a high resolution in the entire zoom area. A numerical embodiment of the present embodiment is as indicated in Table 1 described below.

Second Embodiment

Figure 4:
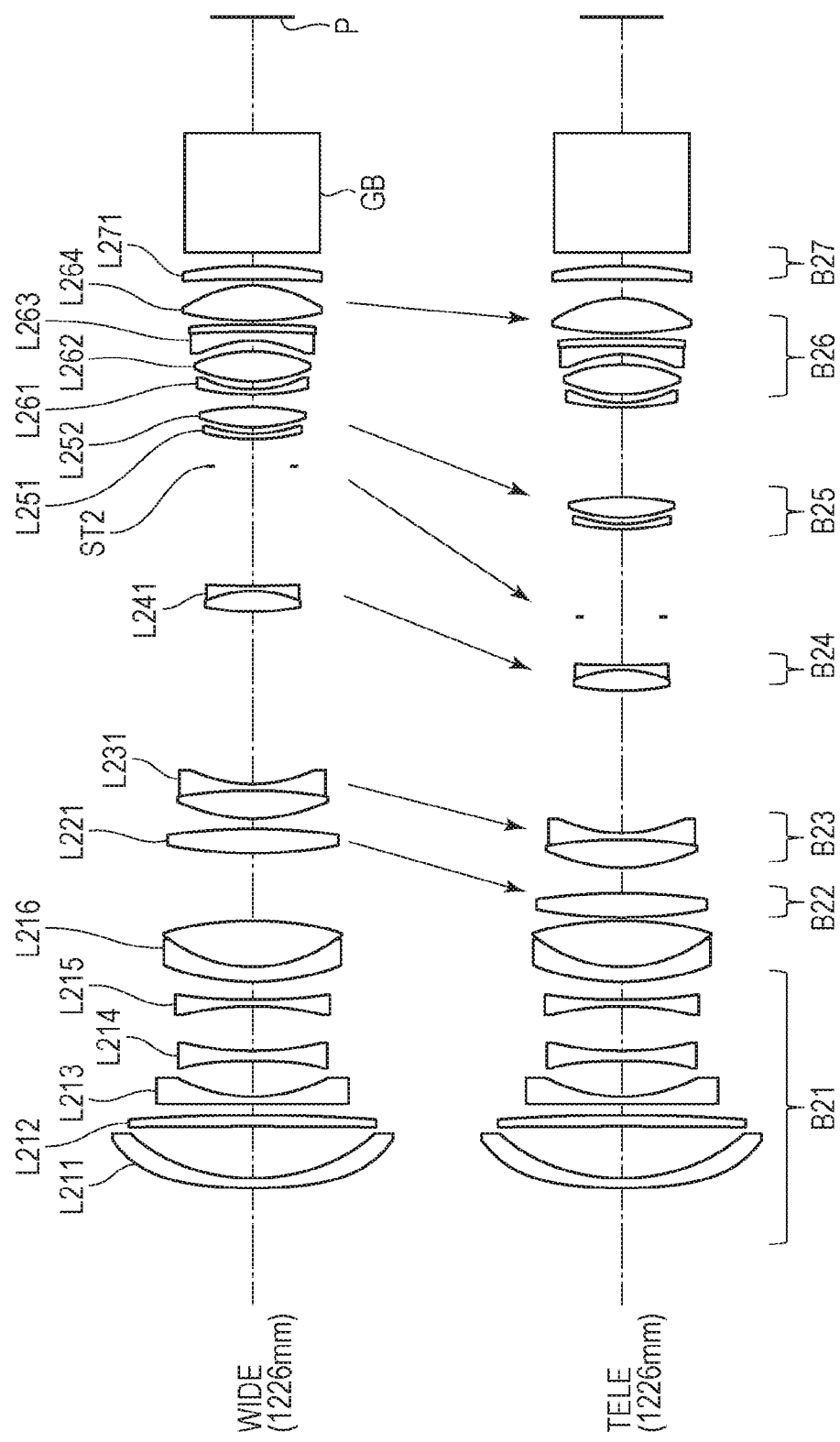
FIG. 4 is a cross-section view illustrating a configuration of a zoom lens according to a second embodiment.

The projection lens according to the present embodiment will be described with reference to FIG. 4 to FIG. 6. FIG. 4 is a diagram illustrating a configuration of the projection lens according to the present embodiment with a projection distance of 1226 mm. The upper part of FIG. 4 illustrates a configuration at the wide-angle end and the lower part thereof illustrates a configuration at the telephoto end.

The projection lens according to the present embodiment includes the following lens units which are sequentially arranged from the enlargement conjugate side toward the reduction conjugate side. That is, the projection lens according to the present embodiment includes a negative first lens unit B21 immovable for zooming, and a positive second lens unit B22, a negative third lens unit B23, and a positive fourth lens unit B24 which move for zooming, respectively. The projection lens according to the present embodiment further includes a stop ST2 independently moving for zooming, and a positive fifth lens unit B25 and a positive sixth lens unit B26 which move for zooming, respectively. The projection lens according to the present embodiment further includes a positive seventh lens unit B27 immovable for zooming.

That is, the first lens unit B21 and the seventh lens unit B27 are immovable (fixed) for zooming. The second lens unit B22 and the third lens unit B23 move while widening the interval therebetween, and the third lens unit B23 and the fourth lens unit B24 move while narrowing the interval therebetween. The fifth and sixth lens units move from the reduction conjugate side toward the enlargement conjugate side.

The first lens unit B21 is configured of a negative lens L211, a positive lens L212, a negative lens L213, a negative lens L214, a negative lens L215, and a positive assembled lens L216 from the enlargement conjugate side toward the reduction conjugate side in this order. The second lens unit B22 is configured of a positive lens L221. The third lens unit B23 is configured of a negative assembled lens L231. The fourth lens unit B24 is configured of a positive assembled lens L241.

The flare-cut stop ST2 (not illustrated) for shielding an off-axis beam is provided between the third lens unit B23 and the fourth lens unit B24.

The fifth lens unit B25 is configured of a negative lens L251 and a positive lens L252 from the enlargement conjugate side toward the reduction conjugate side in this order. The sixth lens unit B26 is configured of a negative lens L261, a positive lens L262, a negative assembled lens L263, and a positive lens L264 from the enlargement conjugate side toward the reduction conjugate side in this order. The seventh lens unit B27 is configured of a positive lens L271.

Figure 5:
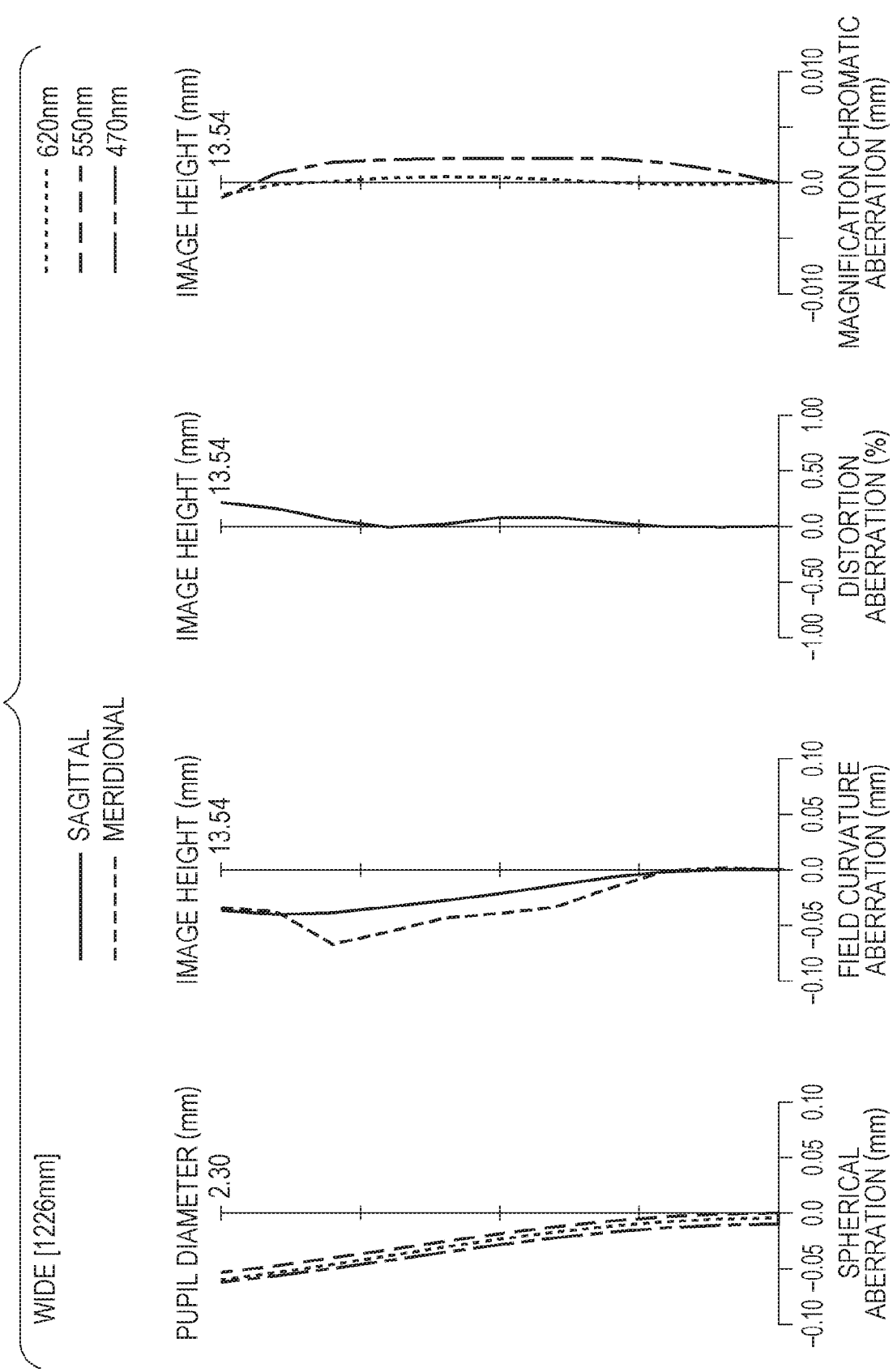
FIG. 5 is an aberration diagram with a projection distance of 1226 mm at a wide-angle end of the zoom lens according to the second embodiment.
Figure 6:
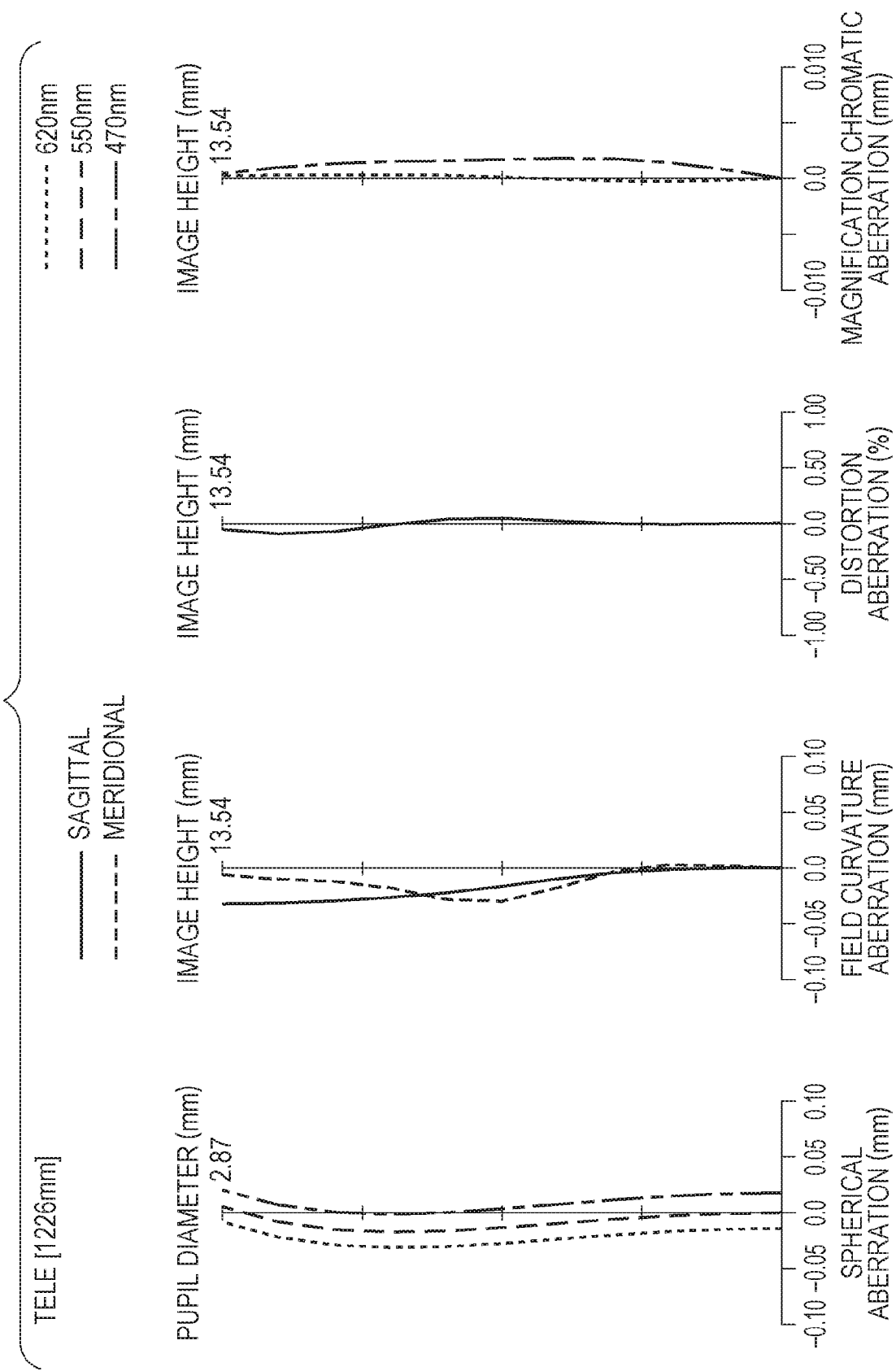
FIG. 6 is an aberration diagram with a projection distance of 1226 mm at a telephoto end of the zoom lens according to the second embodiment.

FIG. 5 is a longitudinal aberration diagram with a projection distance of 1226 mm at the wide-angle end of the projection lens according to the present embodiment. FIG. 6 is a longitudinal aberration diagram with a projection distance of 1226 mm at the telephoto end of the projection lens according to the present embodiment. As illustrated in FIG. 5 and FIG. 6, it can be seen that the projection lens according to the present embodiment less changes in its performance and obtains a high resolution in the entire zoom area. Further, the projection lens according to the present embodiment has less lens units by one than the projection lens according to the first embodiment, thereby achieving lower cost. A numerical embodiment of the present embodiment is as indicated in Table 2 described below.

Third Embodiment

Figure 7:
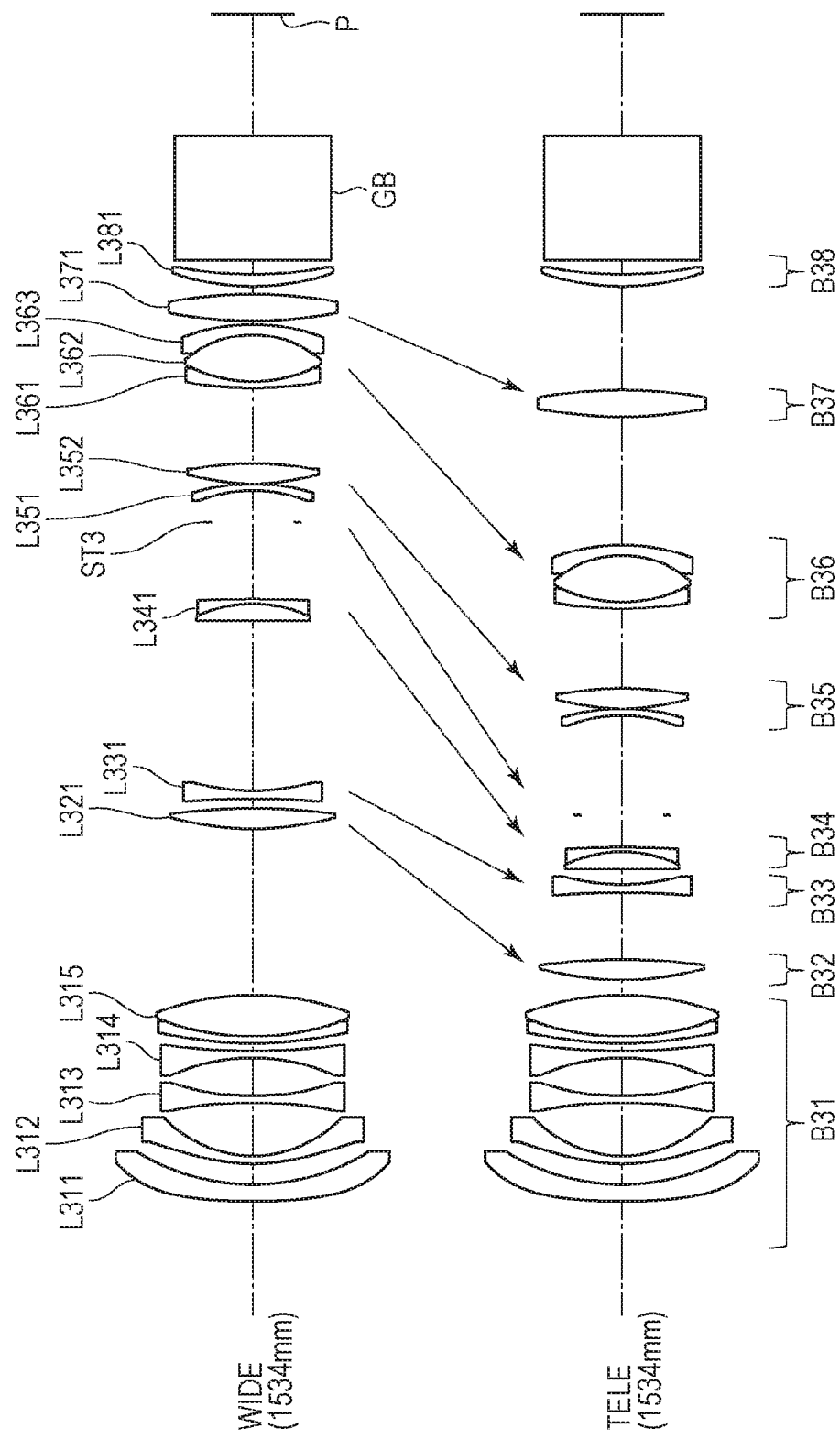
FIG. 7 is a cross-section view illustrating a configuration of a zoom lens according to a third embodiment.

The projection lens according to the present embodiment will be described with reference to FIG. 7 to FIG. 9. FIG. 7 is a diagram illustrating a configuration of the projection lens according to the present embodiment with a projection distance of 1534 mm. The upper part of FIG. 7 illustrates a configuration at the wide-angle end, and the lower part thereof illustrates a configuration at the telephoto end. The projection lens according to the present embodiment realizes a high magnification variation ratio, or twice the zoom ratio while it has a relatively large half angle of view of 38.10 degrees at the wide-angle end.

The projection lens according to the present embodiment includes the following lens units which are sequentially arranged from the enlargement conjugate side toward the reduction conjugate side. That is, the projection lens according to the present embodiment includes a negative first lens unit B31 immovable for zooming, and a positive second lens unit B32, a negative third lens unit B33, and a positive fourth lens unit B34 which move for zooming, respectively. The projection lens according to the present embodiment further includes a stop ST3 independently moving for zooming, and a positive fifth lens unit B35, a positive sixth lens unit B36, and a negative seventh lens unit B37 which move for zooming, respectively. The projection lens according to the present embodiment further includes a positive eighth lens unit B38 immovable for zooming.

That is, the first lens unit B31 and the eighth lens unit B38 are immovable (fixed) for zooming. The second lens unit B32 and the third lens unit B33 move while widening the interval therebetween, and the third lens unit B33 and the fourth lens unit B34 move while narrowing the interval therebetween. The fifth, sixth, and seventh lens units move from the reduction conjugate side toward the enlargement conjugate side.

The first lens unit B31 is configured of a negative lens L311, a negative lens L312, a negative lens L313, a negative lens L314, and a positive assembled lens L315 from the enlargement conjugate side toward the reduction conjugate side in this order. The second lens unit B32 is configured of a positive lens L321. The third lens unit B33 is configured of a negative lens L331. The fourth lens unit B34 is configured of a positive assembled lens L341. The fifth lens unit B35 is configured of a negative lens L351 and a positive lens L352 from the enlargement conjugate side toward the reduction conjugate side in this order. The sixth lens unit B36 is configured of a negative lens L361, a positive lens L362, and a negative lens L363 from the enlargement conjugate side toward the reduction conjugate side in this order. The seventh lens unit B37 is configured of a positive lens B371. The eighth lens unit B38 is configured of a positive lens L381.

The flare-cut stop ST3 for shielding an off-axis beam is provided between the third lens unit B33 and the fourth lens unit B34.

Figure 8:
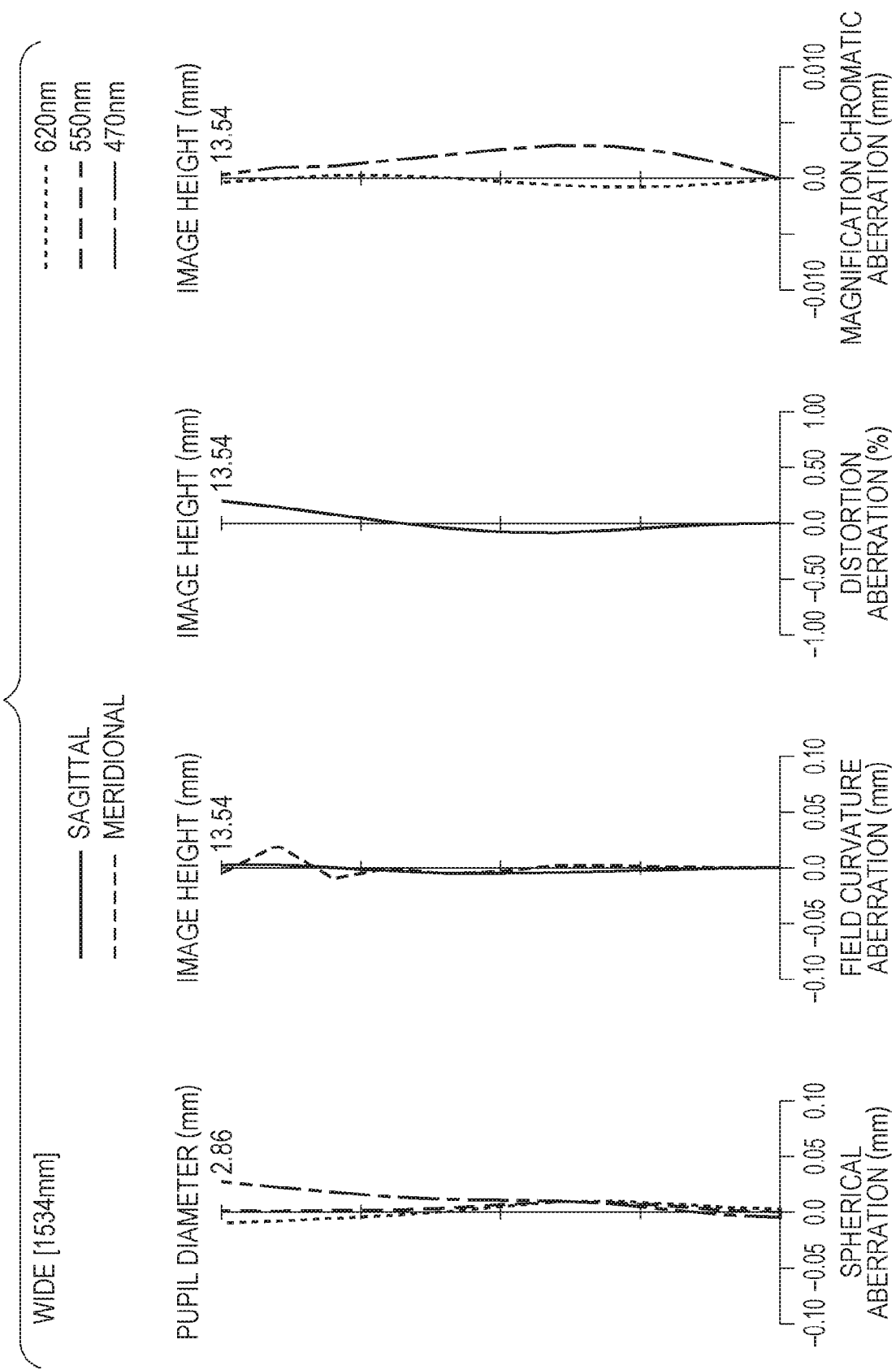
FIG. 8 is an aberration diagram with a projection distance of 1534 mm at a wide-angle end of the zoom lens according to the third embodiment.
Figure 9:
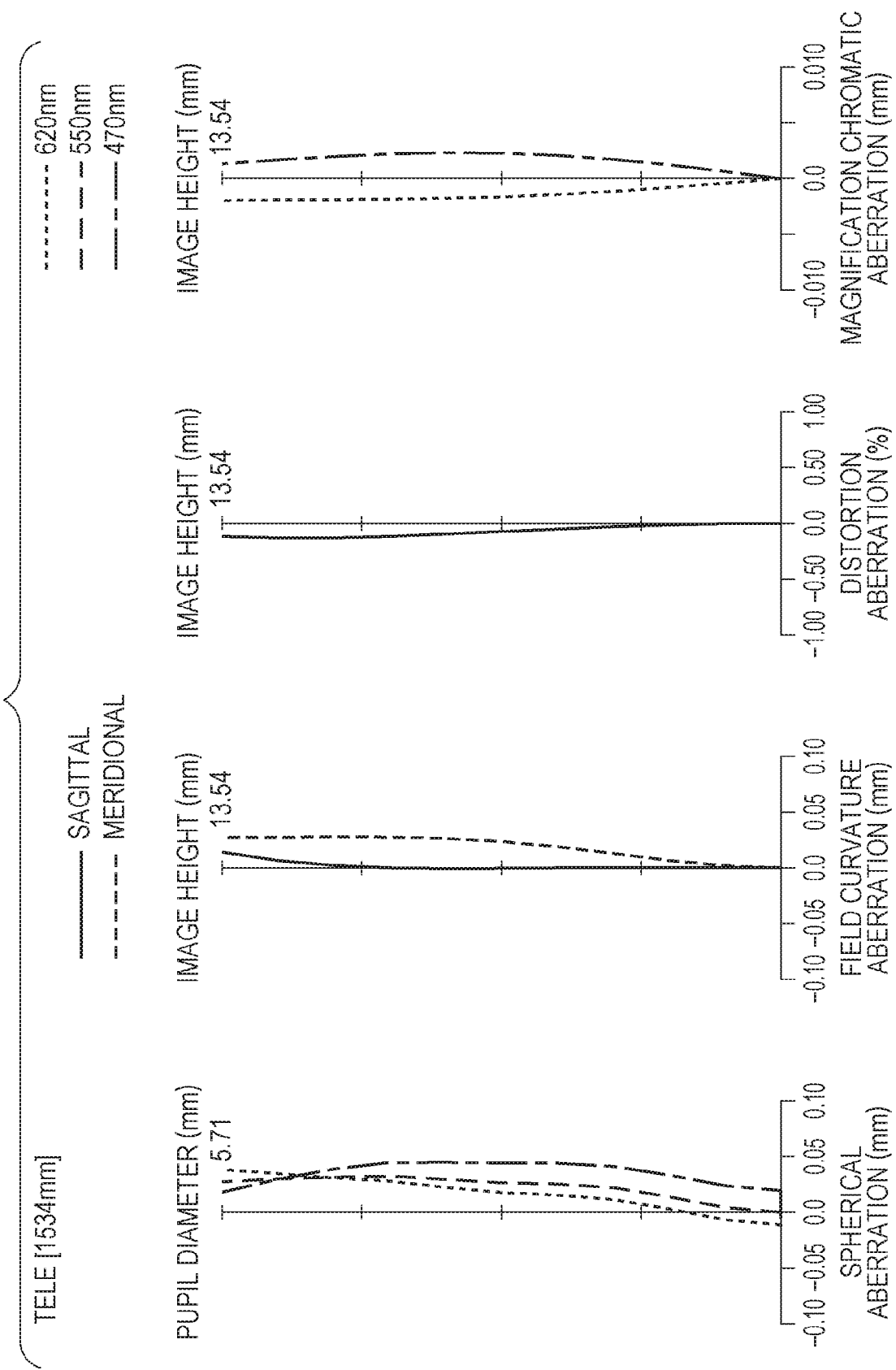
FIG. 9 is an aberration diagram with a projection distance of 1534 mm at a telephoto end of the zoom lens according to the third embodiment.

FIG. 8 is a longitudinal aberration diagram with a projection distance of 1534 mm at the wide-angle end of the projection lens according to the present embodiment. FIG. 9 is a longitudinal aberration diagram with a projection distance of 1534 mm at the telephoto end of the projection lens according to the present embodiment. As illustrated in FIG. 8 and FIG. 9, it can be seen that the projection lens according to the present embodiment less changes in its performance and obtains a high resolution in the entire zoom area. Further, a higher magnification variation ratio (zoom ratio) can be realized. A numerical embodiment of the present embodiment is as indicated in Table 3 described below.

Fourth Embodiment

Figure 10:
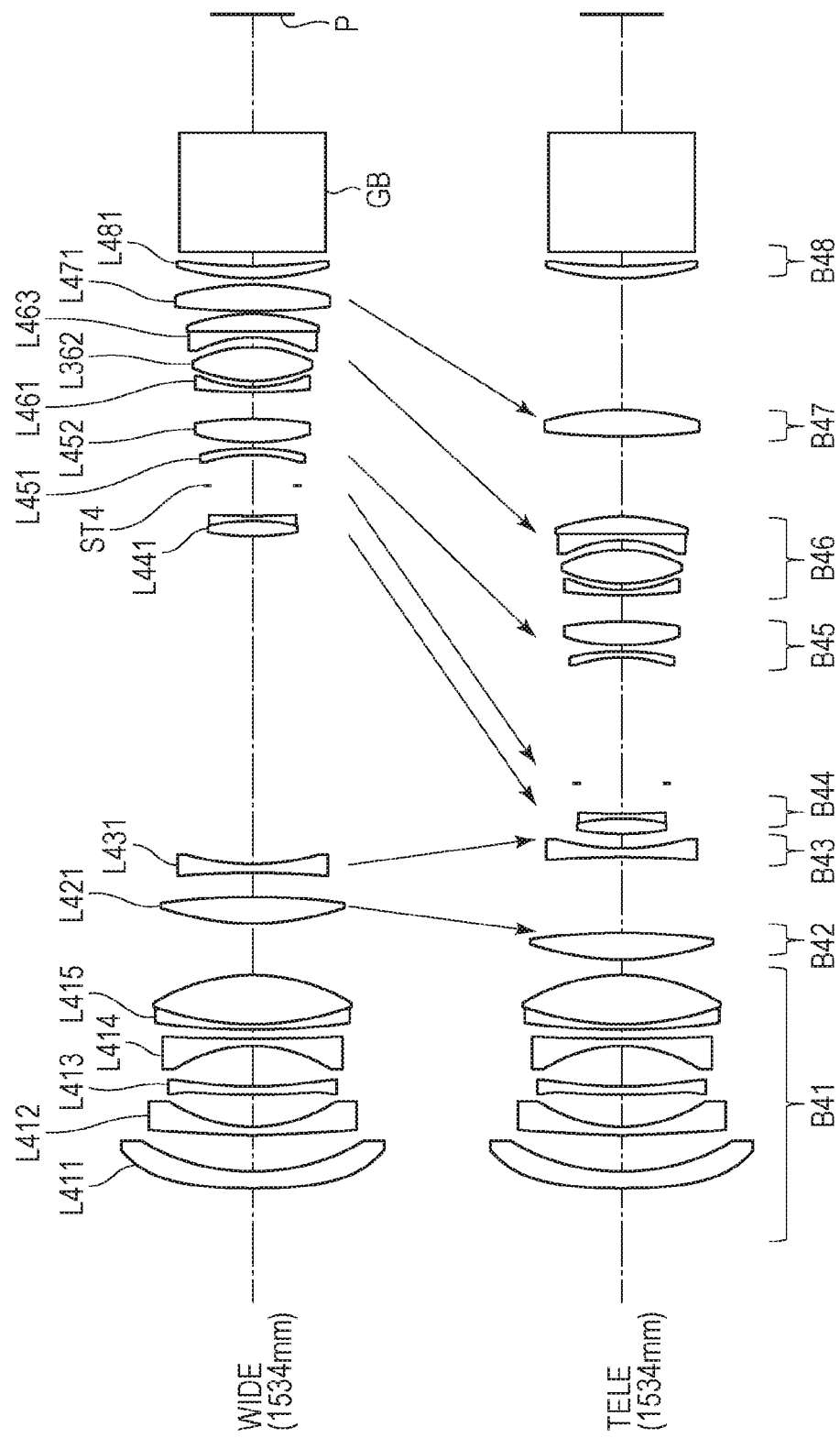
FIG. 10 is a cross-section view illustrating a configuration of a zoom lens according to a fourth embodiment.

The projection lens according to the present embodiment will be described with reference to FIG. 10 to FIG. 12. FIG. 10 is a diagram illustrating a configuration of the projection lens according to the present embodiment with a projection distance of 1534 mm. The upper part of FIG. 10 illustrates a configuration at the wide-angle end, and the lower part thereof illustrates a configuration at the telephoto end. The third lens unit moves from the reduction conjugate side toward the enlargement conjugate side during zooming in the projection lenses according to the second embodiment and the third embodiment. To the contrary, the third lens unit moves from the enlargement conjugate side toward the reduction conjugate side during zooming in the projection lenses according to the first embodiment and the present embodiment. Thus, the negative third lens unit can be arranged closer to the enlargement conjugate side at the wide-angle end.

The projection lens according to the present embodiment includes the following lens units which are sequentially arranged from the enlargement conjugate side toward the reduction conjugate side. That is, the projection lens according to the present embodiment includes a negative first lens unit B41 immovable for zooming, and a positive second lens unit B42, a negative third lens unit B43, and a positive fourth lens unit B44 which move for zooming, respectively. The projection lens according to the present embodiment further includes a stop ST4 independently moving for zooming, and a positive fifth lens unit B45, a positive sixth lens unit B46, and a negative seventh lens unit B47 which move for zooming, respectively. The projection lens according to the present embodiment further includes a positive eighth lens unit B48 immovable for zooming.

That is, the first lens unit B41 and the eighth lens unit B48 are immovable (fixed) for zooming. The second lens unit B42 and the third lens unit B43 move while widening the interval therebetween, and the third lens unit B43 and the fourth lens unit B44 move while narrowing the interval therebetween. The fifth, sixth, and seventh lens units move from the reduction conjugate side toward the enlargement conjugate side.

The first lens unit B41 is configured of a negative lens L411, a negative lens L412, a negative lens L413, a negative lens L414, and a positive assembled lens L415 from the enlargement conjugate side toward the reduction conjugate side in this order. The second lens unit B42 is configured of a positive lens L421. The third lens unit B43 is configured of a negative lens L431. The fourth lens unit B44 is configured of a positive assembled lens L441. The fifth lens unit B45 is configured of a negative lens L451 and a positive lens L452 from the enlargement conjugate side toward the reduction conjugate side in this order. The sixth lens unit B46 is configured of a negative lens L461, a positive lens L462, and a negative lens L463 from the enlargement conjugate side toward the reduction conjugate side in this order. The seventh lens unit B47 is configured of a positive lens B471. The eighth lens unit B48 is configured of a positive lens B481.

The flare-cut stop ST4 for shielding an off-axis beam is provided between the fourth lens unit B44 and the fifth lens unit B45.

Figure 11:
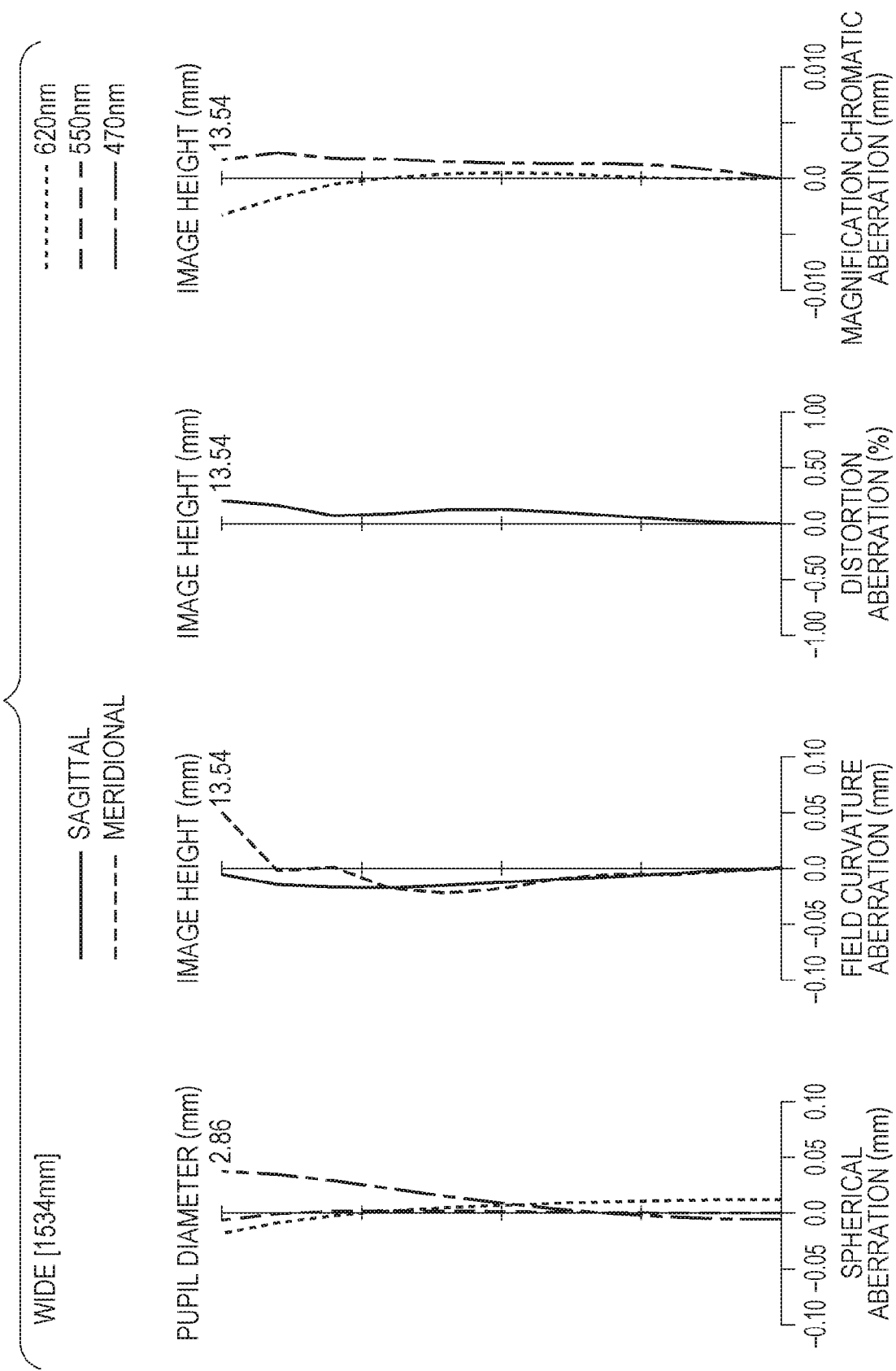
FIG. 11 is an aberration diagram with a projection distance of 1534 mm at a wide-angle end of the zoom lens according to the fourth embodiment.
Figure 12:
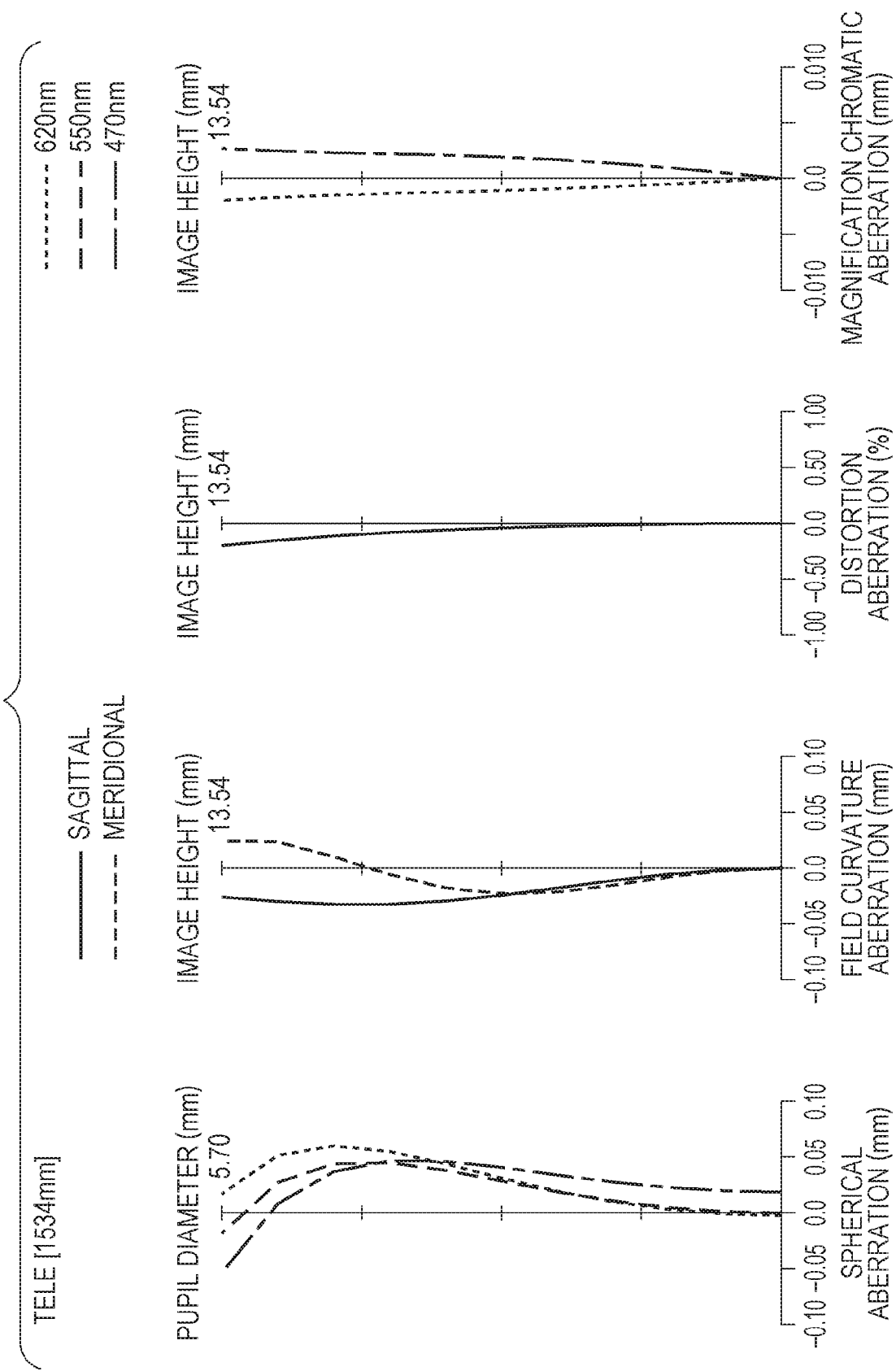
FIG. 12 is an aberration diagram with a projection distance of 1534 mm at a telephoto end of the zoom lens according to the fourth embodiment.

FIG. 11 is a longitudinal aberration diagram with a projection distance of 1534 mm at the wide-angle end of the projection lens according to the present embodiment. FIG. 12 is a longitudinal aberration diagram with a projection distance of 1534 mm at the telephoto end of the projection lens according to the present embodiment. As illustrated in FIG. 11 and FIG. 12, it can be seen that the projection lens according to the present embodiment less changes in its performance and obtains a high resolution in the entire zoom area. A numerical embodiment of the present embodiment is as indicated in Table 4 described below.

Each embodiment has been described above, but the form of each embodiment does not intend to limit the application scope of the disclosure, and can be changed as needed or improved without departing from the nature or spirit of the disclosure. For example, the configuration of an imaging optical system according to each embodiment may be applied to not a projection lens for projector but a shooting lens for camera.

Numerical Embodiments

Lens data in the numerical embodiments corresponding to the respective embodiments will be indicated.

(A) in each Table indicates lens data, and a plane number indicates a plane counted from the enlargement conjugate side. r is a curvature radius, d is an interval between a plane with a corresponding plane number and a next plane closer to the reduction conjugate side, and the unit of them is mm. n and v indicate a refractive index and an Abbe constant with respect to the d-line of an optical member at each corresponding plane number, respectively.

A plane denoted with * on the left side is an aspherical shape according to the following function, and the coefficients are indicated in (B) in each Table. y indicates a coordinate in the diameter direction, z indicates a coordinate in the optical axis direction, and k indicates a Korenich coefficient. Further, E-X indicates $10^{-X}$.

$$z(y) = (y^2/ri)/[1+\{1-(1+k)(y^2/ri^2)\}^{1/2}] + C4 \cdot y^4 + C6 \cdot y^6 + C8 \cdot y^8 + C10 \cdot y^{10} + C12 \cdot y^{12} + C14 \cdot y^{14} + C16 \cdot y^{16} \quad (6)$$

The elements corresponding to each embodiment are indicated in (C) in each Table, and f in Tables indicates a focal distance at a corresponding magnification variation position in mm. F indicates an aperture ratio at a corresponding magnification variation position. ω indicates a half angle of view at a corresponding magnification variation position in degree.

A plane interval of a plane variable in the lens data in (A) is indicated in mm in (D) in each Table. di in Tables corresponds to a corresponding plane number i in (A).

Table 5 indicates the values of each conditional equation according to each embodiment.

TABLE 1

(Numerical embodiment 1)

(A) Lens configuration

| Plane number | r | d | nd | vd |
|---|---|---|---|---|
| 1* | 251.2841 | 3.2 | 1.775821 | 49.5976 |
| 2 | 54.62781 | 17.66657 | 1 | 0 |
| 3 | −2737.09 | 4.01591 | 1.596251 | 35.3095 |
| 4 | −494.13 | 3.00152 | 1 | 0 |
| 5* | 245.0353 | 2.5 | 1.887605 | 40.7645 |
| 6 | 52.89837 | 10.41691 | 1 | 0 |
| 7* | −822.761 | 3.30312 | 1.858497 | 40.3926 |
| 8* | 78.36661 | 19.06209 | 1 | 0 |
| 9 | −111.498 | 2.2 | 1.775821 | 49.5976 |
| 10 | 218.7614 | 6.97421 | 1 | 0 |
| 11 | 97.64382 | 3 | 1.932124 | 20.88 |
| 12 | 56.14315 | 15.93768 | 1.724867 | 34.7074 |
| 13 | −84.2444 | variable | 1 | 0 |
| 14 | 2082.766 | 4.83439 | 1.754002 | 35.3319 |
| 15 | −172.996 | variable | 1 | 0 |
| 16 | 58.31631 | 8.39161 | 1.676745 | 38.1476 |
| 17 | −158.62 | 2.00958 | 1.775821 | 49.5976 |
| 18 | 52.89321 | variable | 1 | 0 |
| 19 | 0 | variable | 1 | 0 |
| 20 | 123.853 | 5.80525 | 1.754002 | 35.3319 |
| 21 | −33.7283 | 1.5 | 1.887605 | 40.7645 |
| 22 | 456.0334 | variable | 1 | 0 |
| 23 | 0 | variable | 1 | 0 |
| 24 | 137.2152 | 1.7 | 1.838965 | 42.7246 |
| 25 | 56.07513 | 2 | 1 | 0 |
| 26 | 53.81438 | 6.92739 | 1.498303 | 81.5447 |
| 27 | −72.8536 | variable | 1 | 0 |
| 28 | 85.26321 | 1.7 | 1.856231 | 30.0459 |
| 29 | 39.10849 | 2.54425 | 1 | 0 |
| 30 | 49.69284 | 9.77939 | 1.498303 | 81.5447 |
| 31 | −48.0648 | 3.31904 | 1 | 0 |
| 32 | −41.4096 | 3.03165 | 1.905548 | 37.37 |
| 33 | −523.76 | 2.63975 | 1.657615 | 39.6822 |
| 34 | −235.414 | variable | 1 | 0 |
| 35 | 124.4616 | 11.41419 | 1.439742 | 94.6597 |
| 36 | −47.4955 | variable | 1 | 0 |
| 37 | −491.698 | 4.31719 | 1.956935 | 17.9839 |
| 38 | −127.316 | 4.4 | 1 | 0 |
| 39 | 0 | 38.97 | 1.518051 | 64.1411 |
| 40 | 0 | 37.67135 | 1 | 0 |

(B) Aspherical coefficient

| Plane | 1 | 5 | 7 | 8 |
|---|---|---|---|---|
| K | 0 | 0 | 0 | 0 |
| C4 | 3.78E−06 | −6.72E−06 | −1.12E−05 | −1.20E−05 |
| C6 | −2.11E−09 | 2.78E−09 | 3.68E−08 | 3.98E−08 |
| C8 | 1.58E−12 | 8.37E−12 | −6.60E−11 | −5.78E−11 |
| C10 | −7.50E−16 | −9.41E−15 | −6.14E−14 | −1.00E−13 |

TABLE 1-continued (Numerical embodiment 1)

| | | | | |
|---|---|---|---|---|
| C12 | 2.63E−19 | 3.16E−18 | 3.20E−16 | 4.90E−16 |
| C14 | −5.50E−23 | 0 | −3.43E−19 | −6.20E−19 |
| C16 | 6.77E−27 | 0 | 1.19E−22 | 2.73E−22 |

(C) Focal distance, F number, half angle of view

| | Wide-angle end, | telephoto end |
|---|---|---|
| f | 13.7619 | 17.2063 |
| FNO | 2.9977 | 2.999 |
| ω | 44.2218 | 40.8888 |

(D) Plane interval corresponding to magnification variation position

| Plane number, | wide-angle end, | telephoto end, | remarks |
|---|---|---|---|
| 13 | 15.77314 | 2.631145 | |
| 15 | 13.36641 | 56.86406 | |
| 18 | 34.37538 | 5.407684 | |
| 19 | 34.17179 | 0.592316 | flare-cut stop |
| 22 | 24.12158 | 29.33692 | |
| 23 | 8 | 15.57319 | aperture stop |
| 27 | 4 | 14.10549 | |
| 34 | 1 | 2.108758 | |
| 36 | 2 | 10.18873 | |

TABLE 2

(Numerical embodiment 2)

(A) Lens configuration

| Plane number | r | d | nd | vd |
|---|---|---|---|---|
| 1* | 522.2514 | 3.2 | 1.775821 | 49.5976 |
| 2 | 67.84153 | 16.92022 | 1 | 0 |
| 3 | −1009.29 | 3.57197 | 1.439742 | 94.6597 |
| 4 | −470.112 | 3.21796 | 1 | 0 |
| 5* | 257.8645 | 2.52209 | 1.887605 | 40.7645 |
| 6 | 54.56998 | 11.40953 | 1 | 0 |
| 7* | −1245.54 | 3.38254 | 1.858497 | 40.3926 |
| 8* | 72.18849 | 14.42988 | 1 | 0 |
| 9 | −115.81 | 2.2 | 1.775821 | 49.5976 |
| 10 | 172.5293 | 6.07687 | 1 | 0 |
| 11 | 80.55797 | 4.91437 | 1.932124 | 20.88 |
| 12 | 47.53703 | 14.97048 | 1.724867 | 34.7074 |
| 13 | −122.2 | variable | 1 | 0 |
| 14 | 152.6616 | 8.11297 | 1.754002 | 35.3319 |
| 15 | −222.717 | variable | 1 | 0 |
| 16 | 60.5149 | 9.1638 | 1.676745 | 38.1476 |
| 17 | −134.978 | 2 | 1.775821 | 49.5976 |
| 18 | 49.1082 | variable | 1 | 0 |
| 19 | 0 | variable | 1 | 0 |
| 20 | 85.04541 | 6.80532 | 1.754002 | 35.3319 |
| 21 | −40.5014 | 1.5 | 1.887605 | 40.7645 |
| 22 | 134.9962 | variable | 1 | 0 |
| 23 | 0 | variable | 1 | 0 |
| 24 | 76.70471 | 1.7 | 1.838965 | 42.7246 |
| 25 | 48.9168 | 2 | 1 | 0 |
| 26 | 51.68743 | 6.77453 | 1.498303 | 81.5447 |
| 27 | −90.5056 | variable | 1 | 0 |
| 28 | 86.04154 | 1.7 | 1.856231 | 30.0459 |
| 29 | 38.07087 | 2.66344 | 1 | 0 |
| 30 | 49.93414 | 9.61553 | 1.498303 | 81.5447 |
| 31 | −50.5674 | 3.70704 | 1 | 0 |
| 32 | −39.6258 | 2.8 | 1.905548 | 37.37 |
| 33 | −242.459 | 2.18616 | 1.657615 | 39.6822 |
| 34 | −260.877 | 1.59626 | 1 | 0 |
| 35 | 132.0891 | 11.3099 | 1.439742 | 94.6597 |
| 36 | −42.5025 | variable | 1 | 0 |
| 37 | −495.224 | 4.29988 | 1.956935 | 17.9839 |
| 38 | −125.892 | 4.4 | 1 | 0 |
| 39 | 0 | 38.97 | 1.518051 | 64.1411 |
| 40 | 0 | 37.67386 | 1 | 0 |

TABLE 2-continued (Numerical embodiment 2)

(B) Aspherical coefficient

| Plane | 1 | 5 | 7 | 8 |
|---|---|---|---|---|
| K | 0 | 0 | 0 | 0 |
| C4 | 3.95E−06 | −6.78E−06 | −1.06E−05 | −1.14E−05 |
| C6 | −2.26E−09 | 2.84E−09 | 3.14E−08 | 3.47E−08 |
| C8 | 1.57E−12 | 8.15E−12 | −3.21E−11 | −2.65E−11 |
| C10 | −7.25E−16 | −9.58E−15 | −1.64E−13 | −2.00E−13 |
| C12 | 2.51E−19 | 3.32E−18 | 4.68E−16 | 6.33E−16 |
| C14 | −5.58E−23 | 0 | −4.22E−19 | −6.82E−19 |
| C16 | 7.04E−27 | 0 | 1.11E−22 | 2.45E−22 |

(C) Focal distance, F number, half angle of view

| | Wide-angle end, | telephoto end |
|---|---|---|
| f | 13.7724 | 17.2184 |
| FNO | 2.9979 | 3.0014 |
| ω | 44.1692 | 37.9574 |

(D) Plane interval corresponding to magnification variation position

| Plane number, | wide-angle end, | telephoto end, | remarks |
|---|---|---|---|
| 13 | 21.84318 | 1 | |
| 15 | 3.385612 | 8.158197 | |
| 18 | 28.8222 | 27.03219 | |
| 19 | 27.31848 | 41.68216 | flare-cut stop |
| 22 | 39.0265 | 15.81633 | |
| 23 | 8.853282 | 28.46217 | aperture stop |
| 27 | 4 | 29.05387 | |
| 36 | 2 | 6.269157 | |

TABLE 3

(Numerical embodiment 3)

(A) Lens configuration

| Plane number | r | d | nd | vd |
|---|---|---|---|---|
| 1* | 457.8688 | 5.1947 | 1.715821 | 53.8663 |
| 2 | 68.226 | 6.33956 | 1 | 0 |
| 3* | 52.80395 | 2.5 | 1.887605 | 40.7645 |
| 4 | 37.44914 | 16.63943 | 1 | 0 |
| 5 | −134.158 | 2.2 | 1.439742 | 94.6597 |
| 6 | 79.15213 | 11.8414 | 1 | 0 |
| 7 | −62.1664 | 2.2 | 1.439742 | 94.6597 |
| 8 | 202.0375 | 2.40099 | 1 | 0 |
| 9 | 135.0292 | 2.2 | 1.956935 | 17.9839 |
| 10 | 81.61557 | 12.85025 | 1.724867 | 34.7074 |
| 11 | −82.7871 | variable | 1 | 0 |
| 12 | 97.15138 | 6.35843 | 1.855622 | 31.9994 |
| 13 | −187.938 | variable | 1 | 0 |
| 14 | −257.894 | 2.5 | 1.775821 | 49.5976 |
| 15 | 68.00115 | variable | 1 | 0 |
| 16 | −37000 | 5.30786 | 1.723331 | 46.0238 |
| 17 | −40.9764 | 1.5 | 1.838965 | 42.7246 |
| 18 | −318.253 | variable | 1 | 0 |
| 19 | 0 | variable | 1 | 0 |
| 20 | −45.2653 | 2 | 1.876194 | 37.2363 |
| 21 | −68.2609 | 0.1 | 1 | 0 |
| 22* | 73.36602 | 6.33512 | 1.585224 | 59.3738 |
| 23* | −101.163 | variable | 1 | 0 |
| 24 | 126.1279 | 1.8 | 1.916303 | 35.2494 |
| 25 | 43.34441 | 0.47401 | 1 | 0 |
| 26 | 44.64092 | 14.01209 | 1.439742 | 94.6597 |
| 27 | −32.3805 | 0.44235 | 1 | 0 |
| 28 | −33.4276 | 3.10941 | 1.905548 | 37.37 |
| 29 | −60.36 | variable | 1 | 0 |
| 30 | 129.1231 | 8.41332 | 1.439742 | 94.6597 |
| 31 | −144.785 | variable | 1 | 0 |
| 32 | 73.21688 | 3.82872 | 1.956935 | 17.9839 |
| 33 | 117.3949 | 4.4 | 1 | 0 |

TABLE 3-continued (Numerical embodiment 3)

| | | | | |
|---|---|---|---|---|
| 34 | 0 | 38.97 | 1.518051 | 64.1411 |
| 35 | 0 | 38.02672 | 1 | 0 |

(B) Aspherical coefficient

| Plane | 1 | 3 | 22 | 23 |
|---|---|---|---|---|
| K | 0 | 0 | 0 | 0 |
| C4 | 4.95E−06 | −4.51E−06 | −2.59E−07 | −7.43E−08 |
| C6 | −3.90E−09 | 1.36E−09 | −1.10E−09 | −2.34E−09 |
| C8 | 4.15E−12 | −3.41E−13 | 1.23E−11 | 2.93E−11 |
| C10 | −3.48E−15 | −1.69E−15 | −9.31E−14 | −1.99E−13 |
| C12 | 2.12E−18 | 2.91E−18 | 4.29E−16 | 8.00E−16 |
| C14 | −7.69E−22 | −2.13E−21 | −9.97E−19 | −1.68E−18 |
| C16 | 1.29E−25 | 5.86E−25 | 1.01E−21 | 1.53E−21 |

(C) Focal distance, F number, half angle of view

| | Wide-angle end, | telephoto end |
|---|---|---|
| f | 17.1661 | 34.4063 |
| FNO | 2.9979 | 3.0118 |
| ω | 38.0946 | 21.4605 |

(D) Plane interval corresponding to magnification variation position

| Plane number, | wide-angle end, | telephoto end, | remarks |
|---|---|---|---|
| 11 | 52.11431 | 5 | |
| 13 | 3 | 21.14973 | |
| 15 | 53.23007 | 5 | |
| 18 | 23.9735 | 10 | |
| 19 | 10 | 31.19333 | aperture stop |
| 23 | 23.69834 | 24.9512 | |
| 29 | 1 | 40.14431 | |
| 31 | 2.436134 | 32.01379 | |

TABLE 4

(Numerical embodiment 4)

(A) Lens configuration

| Plane number | r | d | nd | vd |
|---|---|---|---|---|
| 1* | 500 | 5.5 | 1.775821 | 49.5976 |
| 2 | 69.5719 | 11.58944 | 1 | 0 |
| 3* | 118.9082 | 2.88197 | 1.887605 | 40.7645 |
| 4 | 46.85184 | 10.2789 | 1 | 0 |
| 5* | 136.7641 | 2.7808 | 1.858497 | 40.3926 |
| 6* | 95.14901 | 13.24788 | 1 | 0 |
| 7 | −45.233 | 2.2 | 1.608283 | 63.71 |
| 8 | 481.8936 | 3 | 1 | 0 |
| 9 | 219.0754 | 1.8 | 1.956935 | 17.9839 |
| 10 | 91.50465 | 16 | 1.724867 | 34.7074 |
| 11 | −60.5488 | variable | 1 | 0 |
| 12 | 92.30816 | 8.58451 | 1.855835 | 32.2696 |
| 13 | −213.189 | variable | 1 | 0 |
| 14 | −286.461 | 2.5 | 1.746514 | 49.3251 |
| 15 | 69.86367 | variable | 1 | 0 |
| 16 | 83.30582 | 5.03396 | 1.7346 | 40.5003 |
| 17 | −66.1945 | 1.5 | 1.83661 | 40.097 |
| 18 | 168.7463 | variable | 1 | 0 |
| 19 | 0 | variable | 1 | 0 |
| 20 | −47.92 | 2 | 1.855835 | 32.2696 |
| 21 | −74.0907 | 2 | 1 | 0 |
| 22 | 67.95117 | 7.73265 | 1.573651 | 52.9513 |
| 23 | −107.563 | variable | 1 | 0 |
| 24 | 153.3053 | 1.8 | 1.916303 | 35.2494 |
| 25 | 42.75497 | 2.01272 | 1 | 0 |
| 26 | 46.72479 | 10.90498 | 1.439742 | 94.6597 |
| 27 | −42.5846 | 3.27766 | 1 | 0 |
| 28 | −37.9417 | 1.8 | 1.905548 | 37.37 |
| 29 | 1044.649 | variable | 1.74641 | 49.3387 |
| 30 | −59.6643 | 1 | 1 | 0 |
| 31 | 236.3734 | variable | 1.439742 | 94.6597 |
| 32 | −86.3736 | 2.17494 | 1 | 0 |
| 33 | 83.42048 | 3.90491 | 1.956935 | 17.9839 |
| 34 | 163.7318 | 4.4 | 1 | 0 |
| 35 | 0 | 38.97 | 1.518051 | 64.1411 |
| 36 | 0 | 38.47786 | 1 | 0 |

(B) Aspherical coefficient

| Plane | 1 | 3 | 5 | 6 |
|---|---|---|---|---|
| K | 0 | 0 | 0 | 0 |
| C4 | 4.35E−06 | −4.29E−06 | −9.58E−06 | −9.01E−06 |
| C6 | −2.44E−09 | −7.70E−10 | 3.19E−08 | 3.41E−08 |
| C8 | 2.05E−12 | 3.66E−12 | −1.03E−10 | −1.23E−10 |
| C10 | −1.22E−15 | −1.52E−15 | 2.95E−13 | 3.88E−13 |
| C12 | 4.91E−19 | 2.90E−19 | −5.47E−16 | −7.69E−16 |
| C14 | −5.38E−23 | 0.00E+00 | 4.82E−19 | 7.55E−19 |
| C16 | −1.28E−26 | 0.00E+00 | −1.54E−22 | −2.81E−22 |

(C) Focal distance, F number, half angle of view

| | Wide-angle end, | telephoto end |
|---|---|---|
| f | 17.1493 | 34.3693 |
| FNO | 2.9975 | 3.0123 |
| ω | 38.0967 | 21.4917 |

(D) Plane interval corresponding to magnification variation position

| Plane number, | wide-angle end, | telephoto end, | remarks |
|---|---|---|---|
| 11 | 16.81146 | 5 | |
| 13 | 7.972574 | 24.78403 | |
| 15 | 106.9267 | 5 | |
| 18 | 10 | 10 | |
| 19 | 10 | 40.73026 | aperture stop |
| 23 | 8.50138 | 8.780489 | |
| 29 | 1 | 26.07804 | |
| 31 | 2.174941 | 43.01427 | |

TABLE 5

(Conditional equation calculation results)

| | | First embodiment | Second embodiment | Third embodiment | Fourth embodiment |
|---|---|---|---|---|---|
| Conditional equation (1) | nb3n | 1.772499 | 1.772499 | 1.772499 | 1.743300 |
| Conditional equation (2) | Db2b3WIDE/Db2b3TELE | 0.24 | 0.41 | 0.14 | 0.32 |
| Conditional equation (3) | Db3b4WIDE/Db3b4TELE | 11.4 | 6.0 | 10.6 | 21.4 |

TABLE 5-continued (Conditional equation calculation results)

|  |  | First embodiment | Second embodiment | Third embodiment | Fourth embodiment |
|---|---|---|---|---|---|
| Conditional equation (4) | |FB3/FB4| | 0.10 | 0.16 | 0.01 | 0.19 |
| Conditional equation (5) | nb3n + 0.00733 vb3n | 2.136 | 2.136 | 2.136 | 2.105 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-109868, filed Jun. 7, 2018, which is hereby incorporated by reference herein in its entirety.

What is claimed is:

1. An imaging optical system comprising a plurality of lens units including
a first lens unit having negative refractive power;
a second lens unit having positive refractive power;
a third lens unit having negative refractive power;
a fourth lens unit;
a fifth lens unit;
a sixth lens unit; and
a seventh lens unit which are sequentially arranged from an enlargement conjugate side toward a reduction conjugate side,
wherein the lens units are configured such that an interval between adjacent lens units changes during zooming from a wide-angle end toward a telephoto end,
the first lens unit includes at least one negative lens, and at least one positive lens arranged closer to the reduction conjugate side than the at least one negative lens,
the third lens unit is movable from the enlargement conjugate side toward the reduction conjugate side for the zooming,
wherein, when a refractive index of a lens included in the third lens unit is nb3n, the imaging optical system meets the following equality:

$1.72 \leq nb3n \leq 1.95$, and wherein, when an interval between the second lens unit and the third lens unit at the wide-angle end is Db2b3WIDE and an interval between the second lens unit and the third lens unit at the telephoto end is Db2b3TELE, the following inequality is met:

$0.05 \leq Db2b3\text{WIDE}/Db2b3\text{TELE} \leq 0.70$.

2. The imaging optical system according to claim 1, wherein the second, third, fourth, fifth, and sixth lens units are movable in an optical axis direction of the imaging optical system for the zooming, and
the fourth lens unit is movable from the reduction conjugate side toward the enlargement conjugate side for the zooming.

3. The imaging optical system according to claim 2, wherein the second lens unit is movable from the reduction conjugate side toward the enlargement conjugate side for the zooming.

4. The imaging optical system according to claim 2, wherein, when an interval between the third lens unit and the fourth lens unit at the wide-angle end is Db3b4WIDE and an interval between the third lens unit and the fourth lens unit at the telephoto end is Db3b4TELE, the following inequality is met:

$1.5 \leq Db3b4\text{WIDE}/Db3b4\text{TELE} \leq 50$.

5. The imaging optical system according to claim 1, wherein, when a focal distance of the third lens unit at FB3 and a focal distance of the fourth lens unit is FB4, the following inequality is met:

$0.01 \leq |FB3/FB4| 0.70$.

6. The imaging optical system according to claim 1, wherein, when an Abbe constant of a lens included in the third lens unit is vb3n, the following inequality is met:

$2.0 \leq nb3n + 0.00733 vb3n \leq 2.20$.

7. The imaging optical system according to claim 1, further comprising:
a stop provided closer to the reduction conjugate side than the fourth lens unit.

8. The imaging optical system according to claim 1, wherein the fourth lens unit includes a cemented lens.

9. The imaging optical system according to claim 1, wherein the first lens unit is immovable for the zooming, and
the seventh lens unit is immovable for the zooming.

10. The imaging optical system according to claim 1, wherein the seventh lens unit has positive refractive power.

11. The imaging optical system according to claim 1, wherein the lens units further includes an eighth lens unit arranged closer to the reduction conjugate side than the seventh lens unit,
the first lens unit is immovable for the zooming,
the seventh lens unit is movable in an optical axis direction of the imaging optical system for the zooming, and
the eighth lens unit is immovable for the zooming.

12. The imaging optical system according to claim 1, wherein the eighth lens unit has positive refractive power.

13. An image projection apparatus comprising:
a holding part configured to hold an imaging optical system;
a light source;
an optical modulator; and
a light guide optical system configured to guide light from the light source to the optical modulator and to guide light from the optical modulator to the imaging optical system,
wherein the imaging optical system includes a plurality of lens units including
a first lens unit having negative refractive power,
a second lens unit having positive refractive power,
a third lens unit having negative refractive power,
a fourth lens unit,
a fifth lens unit, a sixth lens unit, and
a seventh lens unit which are sequentially arranged from an enlargement conjugate side toward a reduction conjugate side,
the lens units are configured such that an interval between adjacent lens units changes during zooming from a wide-angle end toward a telephoto end,
the first lens unit includes at least one negative lens, and at least one positive lens arranged closer to the reduction conjugate side than the at least one negative lens,
the third lens unit is movable from the enlargement conjugate side toward the reduction conjugate side for the zooming,
wherein, when a refractive index of a lens included in the third lens unit is nb3n, the imaging optical system meets the following inequality:

$1.72 \leq nb3n \leq 1.95$, and wherein, when an interval between the second lens unit and the third lens unit at the wide-angle end is Db2b3WIDE and an interval between the second lens unit and the third lens unit at the telephoto end is Db2b3TELE, the following inequality is met:

$0.05 \leq Db2b3\text{WIDE}/Db2b3\text{TELE} \leq 0.70$.

14. The imaging optical system according to claim 13, wherein the holding part can detachably hold the imaging optical system.

15. The image projection apparatus according to claim 13, wherein the imaging optical system further includes:
a fifth lens unit,
a sixth lens unit, and
a seventh lens unit which are sequentially arranged after the fourth lens unit from an enlargement conjugate side toward a reduction conjugate side.

16. An image projection apparatus comprising:
an imaging optical system;
a light source;
an optical modulator; and
a light guide optical system configured to guide light from the light source to the optical modulator and to guide light from the optical modulator to the imaging optical system,
wherein the imaging optical system includes a plurality of lens units including
a first lens unit having negative refractive power,
a second lens unit having positive refractive power,
a third lens unit having negative refractive power,
a fourth lens unit,
a fifth lens unit,
a sixth lens unit, and
a seventh lens unit which are sequentially arranged from an enlargement conjugate side toward a reduction conjugate side,
the lens units are configured such that an interval between adjacent lens units changes during zooming from a wide-angle end toward a telephoto end,
the first lens unit includes at least one negative lens, and at least one positive lens arranged closer to the reduction conjugate side than the at least one negative lens,
the third lens unit is movable from the enlargement conjugate side toward the reduction conjugate side for the zooming,
wherein, when a refractive index of a lens included in the third lens unit is nb3n, the imaging optical system meets the following inequality:

$1.72 \leq nb3n \leq 1.95$, and wherein, when an interval between the second lens unit and the third lens unit at the wide-angle end is Db2b3WIDE and an interval between the second lens unit and the third lens unit at the telephoto end is Db2b3TELE, the following inequality is met:

$0.05 \leq Db2b3\text{WIDE}/Db2b3\text{TELE} \leq 0.70$.

17. The image projection apparatus according to claim 16, wherein the imaging optical system further includes:
a fifth lens unit,
a sixth lens unit, and
a seventh lens unit which are sequentially arranged after the fourth lens unit from an enlargement conjugate side toward a reduction conjugate side.

18. An image projection system comprising:
an image projection apparatus; and
a control part configured to control the image projection apparatus,
wherein the image projection apparatus includes
an imaging optical system,
a light source,
an optical modulator, and
a light guide optical system configured to guide light from the light source to the optical modulator and to guide light from the optical modulator to the imaging optical system,
the imaging optical system includes a plurality of lens units including
a first lens unit having negative refractive power,
a second lens unit having positive refractive power,
a third lens unit having negative refractive power,
a fourth lens unit,
a fifth lens unit,
a sixth lens unit, and
a seventh lens unit which are sequentially arranged from an enlargement conjugate side toward a reduction conjugate side,
the lens units are configured such that an interval between adjacent lens units changes during zooming from a wide-angle end toward a telephoto end,
the first lens unit includes at least one negative lens, and at least one positive lens arranged closer to the reduction conjugate side than the at least one negative lens,
the third lens unit is movable from the enlargement conjugate side toward the reduction conjugate side for the zooming,
wherein, when a refractive index of a lens included in the third lens unit is nb3n, the imaging optical system meets the following inequality:

$1.72 \leq nb3n \leq 1.95$, and wherein, when an interval between the second lens unit and the third lens unit at the wide-angle end is Db2b3WIDE and an interval between the second lens unit and the third lens unit at the telephoto end is Db2b3TELE, the following inequality is met:

$0.05 \leq Db2b3\text{WIDE}/Db2b3\text{TELE} \leq 0.70$.

19. The image projection apparatus according to claim 18, wherein the imaging optical system further includes:
a fifth lens unit,
a sixth lens unit, and
a seventh lens unit which are sequentially arranged after the fourth lens unit from an enlargement conjugate side toward a reduction conjugate side.

* * * * *